United States Patent
Sun et al.

(10) Patent No.: US 12,324,015 B2
(45) Date of Patent: Jun. 3, 2025

(54) CATEGORY 2 (CAT2) LISTEN-BEFORE-TRANSMIT (LBT) OPERATIONS FOR WIRELESS COMMUNICATIONS

(71) Applicant: QUALCOMM Incorporated, San Diego, CA (US)

(72) Inventors: Jing Sun, San Diego, CA (US); Vinay Chande, San Diego, CA (US); Arumugam Chendamarai Kannan, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/449,873

(22) Filed: Oct. 4, 2021

(65) Prior Publication Data
US 2022/0110156 A1    Apr. 7, 2022

Related U.S. Application Data

(60) Provisional application No. 63/087,767, filed on Oct. 5, 2020, provisional application No. 63/087,770, filed on Oct. 5, 2020.

(51) Int. Cl.
*H04W 24/08* (2009.01)
*H04W 24/10* (2009.01)
(Continued)

(52) U.S. Cl.
CPC ....... *H04W 74/0808* (2013.01); *H04W 24/08* (2013.01); *H04W 24/10* (2013.01);
(Continued)

(58) Field of Classification Search
CPC .......... H04W 74/0808; H04W 74/002; H04W 74/0816; H04W 74/006; H04W 24/08;
(Continued)

(56) References Cited

U.S. PATENT DOCUMENTS

| 7,085,284 B1 | 8/2006 | Negus |
| 10,764,913 B2 | 9/2020 | Yerramalli et al. |

(Continued)

FOREIGN PATENT DOCUMENTS

| CN | 109196944 A | 1/2019 |
| EP | 3451767 A1 | 3/2019 |

(Continued)

OTHER PUBLICATIONS

International Search Report and Written Opinion—PCT/US2021/071720—ISA/EPO—Mar. 14, 2022 (209035WO).
(Continued)

*Primary Examiner* — Meng Vang
*Assistant Examiner* — Hector Reyes
(74) *Attorney, Agent, or Firm* — NORTON ROSE FULBRIGHT US LLP

(57) ABSTRACT

A method of wireless communication includes receiving, by a user equipment (UE) from a base station, a listen-before-talk (LBT) configuration message indicating whether category 2 (Cat2) LBT operations are enabled or disabled for the UE. The method further includes receiving, by the UE from the base station, a channel occupancy time (COT) message configuring the UE with a COT. The method further includes performing, by the UE, an LBT operation based on the LBT configuration message and based on the COT message.

30 Claims, 13 Drawing Sheets

(51) Int. Cl.
    *H04W 72/044*     (2023.01)
    *H04W 74/00*      (2009.01)
    *H04W 74/0808*    (2024.01)
    *H04W 74/0816*    (2024.01)

(52) U.S. Cl.
    CPC ..... *H04W 72/0473* (2013.01); *H04W 74/002* (2013.01); *H04W 74/0816* (2013.01)

(58) Field of Classification Search
    CPC .. H04W 24/10; H04W 72/0473; H04W 48/12
    See application file for complete search history.

(56) References Cited

U.S. PATENT DOCUMENTS

| | | | |
|---|---|---|---|
| 2002/0093913 A1 | 7/2002 | Brown et al. | |
| 2006/0009161 A1 | 1/2006 | Beecher | |
| 2010/0202354 A1* | 8/2010 | Ho | H04B 13/005 370/328 |
| 2015/0009907 A1 | 1/2015 | Merlin et al. | |
| 2016/0309512 A1 | 10/2016 | Li et al. | |
| 2017/0005768 A1 | 1/2017 | Yin et al. | |
| 2017/0048880 A1* | 2/2017 | Anderson | H04W 72/1268 |
| 2018/0270860 A1* | 9/2018 | Bhorkar | H04W 74/006 |
| 2018/0302927 A1 | 10/2018 | Noh et al. | |
| 2019/0098658 A1 | 3/2019 | Noh et al. | |
| 2019/0150170 A1 | 5/2019 | Park et al. | |
| 2019/0159253 A1 | 5/2019 | Koorapaty et al. | |
| 2019/0230706 A1 | 7/2019 | Li et al. | |
| 2020/0008241 A1* | 1/2020 | Zhou | H04W 72/23 |
| 2020/0128583 A1 | 4/2020 | Yerramalli et al. | |
| 2020/0154477 A1 | 5/2020 | Sun et al. | |
| 2020/0205195 A1 | 6/2020 | Sun et al. | |
| 2020/0281018 A1* | 9/2020 | Li | H04W 80/08 |
| 2020/0314902 A1 | 10/2020 | Sun et al. | |
| 2021/0100030 A1* | 4/2021 | Myung | H04W 74/0833 |
| 2021/0337416 A1* | 10/2021 | Wu | H04L 5/0048 |
| 2022/0078841 A1 | 3/2022 | Tiirola et al. | |
| 2022/0110158 A1 | 4/2022 | Sun | |
| 2022/0167423 A1* | 5/2022 | Aldana | H04W 72/23 |
| 2022/0295553 A1* | 9/2022 | Lin | H04W 16/14 |
| 2022/0377683 A1 | 11/2022 | Myung et al. | |
| 2022/0377790 A1* | 11/2022 | Awadin | H04W 74/006 |
| 2023/0126765 A1* | 4/2023 | Yang | H04W 74/0808 370/328 |

FOREIGN PATENT DOCUMENTS

| | | |
|---|---|---|
| GB | 2550200 A | 11/2017 |
| KR | 20190017588 A | 2/2019 |
| WO | 2017165723 | 9/2017 |
| WO | WO-2020091566 A1 | 5/2020 |

OTHER PUBLICATIONS

Multiple-Gigabit/s Radio Equipment Operating in the 60 GHz Band, Harmonised Standard Covering the Essential Requirements of Article 3.2 of Directive 2014/53/EU, ETSI EN 302 567, v2.1.1, Jul. 2017, 40 Pages.

Partial International Search Report—PCT/US2021/071720—ISA/EPO—Jan. 21, 2022 (209035WO).

Nokia, et al., "Channel Access and Co-Existence for NR-U Operation", 3GPP TSG RAN WG1 Meeting #99, R1-1912257, Reno, US, Nov. 18-22, 2019, 2019, Nov. 9, 2019, 17 Pages.

Samsung: "Discussion On Enhanced Cat 2-Based UL LBT", 3GPP TSG RAN WG1 Meeting #84, R1-160570, St Julian's, Malta, Feb. 15-19, 2016, Feb. 6, 2016, pp. 1-5.

\* cited by examiner

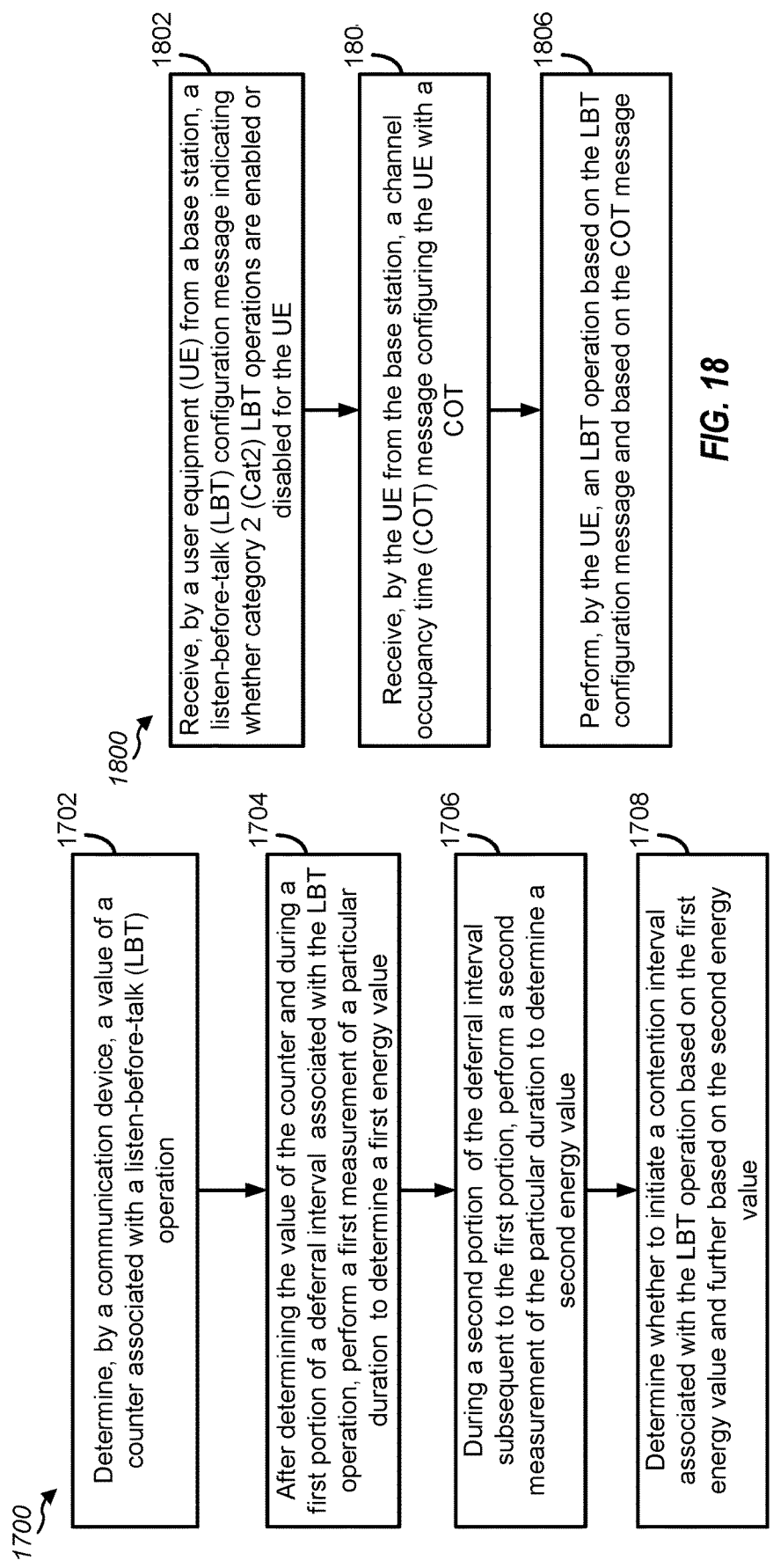

CATEGORY 2 (CAT2) LISTEN-BEFORE-TRANSMIT (LBT) OPERATIONS FOR WIRELESS COMMUNICATIONS

CROSS-REFERENCE TO RELATED APPLICATIONS

This application claims the benefit of U.S. Prov. Pat. App. No. 63/087,767, entitled "CATEGORY 2 (CAT2) LISTEN-BEFORE-TRANSMIT (LBT) OPERATIONS FOR WIRELESS COMMUNICATIONS" and filed on Oct. 5, 2020, and also claims the benefit of U.S. Prov. Pat. App. No. 63/087,770, entitled "CATEGORY 4 (CAT4) LISTEN-BEFORE-TRANSMIT (LBT) OPERATIONS FOR WIRELESS COMMUNICATIONS" and filed on Oct. 5, 2020, which are expressly incorporated by reference herein in their entirety.

TECHNICAL FIELD

Aspects of the present disclosure relate generally to wireless communication systems, and more particularly, to wireless communication systems that perform listen-before-transmit (LBT) operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes a receiver configured to receive, at a user equipment (UE) from a base station, a listen-before-talk (LBT) configuration message indicating whether category 2 (Cat2) LBT operations are enabled or disabled for the UE. The receiver is further configured to receive, at the UE from the base station, a channel occupancy time (COT) message configuring the UE with a COT. The apparatus further includes a transmitter configured to perform a transmission based on an LBT operation. The LBT operation is based on the LBT configuration message and is based further on the COT message.

In some other aspects of the disclosure, an apparatus for wireless communication includes a transmitter configured to transmit, to a UE, an LBT configuration message indicating whether Cat2 LBT operations are enabled or disabled for the UE. The transmitter is further configured to transmit, to the UE, a COT message configuring the UE with a COT. The apparatus further includes a receiver configured to receive a transmission from the UE based on an LBT operation. The LBT operation is based on the LBT configuration message and is based further on the COT message.

In some other aspects of the disclosure, a method of wireless communication includes determining, by a communication device, a value of a counter associated with an LBT operation. The method further includes, after determining the value of the counter and during a first portion of a deferral interval associated with the LBT operation, performing a first measurement of a particular duration to determine a first energy value. The method further includes, during a second portion of the deferral interval subsequent to the first portion, performing a second measurement of the particular duration to determine a second energy value. The method also includes determining whether to initiate a contention interval associated with the LBT operation based on the first energy value and further based on the second energy value.

In some other aspects of the disclosure, a method of wireless communication includes determining, by a communication device, a value of a counter associated with a LBT operation. The method further includes, after a deferral interval associated with the LBT operation and during a contention interval associated with the LBT operation, performing a measurement of a particular duration to determine an energy value. The method further includes determining whether to adjust the value of the counter based on the energy value.

In some other aspects of the disclosure, a method of wireless communication includes determining, by a communication device, a value of a counter associated with a LBT operation. The method further includes, after determining the value of the counter and during a deferral interval associated with the LBT operation, performing a first measurement of a first duration to determine a first energy value. The method further includes, based on the first energy value and during a contention interval following the deferral interval, performing a second measurement of a second duration to determine a second energy value. The method also includes determining whether to adjust the value of the counter based on the second energy value.

In some other aspects of the disclosure, a method of wireless communication includes determining, by a communication device, a value of a counter associated with a LBT operation. The method further includes, after determining the value of the counter, performing a first measurement of a first duration during a first portion of a deferral interval associated with the LBT operation to determine a first energy value. The method further includes, during a second portion of the deferral interval, performing a second measurement of a second duration to determine a second energy value. The method also includes, based on the first energy value and the second energy value, determining whether to initiate a contention interval subsequent to the deferral interval.

In some other aspects of the disclosure, a method of wireless communication includes determining, by a communication device, a value of a counter associated with a LBT operation. The method further includes, after determining the value of the counter and during a first half of a deferral interval associated with the LBT operation, performing a first measurement of a particular duration to determine a first energy value. The method further includes, during a second half of the deferral interval subsequent to the first half, performing a second measurement of the particular duration to determine a second energy value. The method also includes determining whether to initiate a contention interval associated with the LBT operation based on the first energy value and further based on the second energy value. A first length of the deferral interval is an integer multiple of a second length of the contention interval.

In some other aspects of the disclosure, a method of wireless communication includes determining, by a communication device, a value of a counter associated with a LBT operation. The method further includes, after determining the value of the counter and during a deferral interval associated with the LBT operation, performing a first measurement of a first duration to determine a first energy value. The method further includes based on the first energy value and during a contention interval following the deferral interval, performing a second measurement of a second duration to determine a second energy value. The method further includes adjusting the value of the counter based on the second energy value, determining that the adjusted value of the counter satisfies a counter threshold value, and determining that one or more transmission criteria for a transmission based on the LBT operation are unsatisfied. The method also includes, during a self-deferral interval that is based on determining that the adjusted value of the counter satisfies the counter threshold value and that the one or more transmission criteria are unsatisfied, performing a one-shot LBT operation prior to a transmission boundary associated with the transmission.

In some other aspects of the disclosure, a method of wireless communication includes receiving, by a UE from a base station, an LBT configuration message indicating whether Cat2 LBT operations are enabled or disabled for the UE. The method further includes receiving, by the UE from the base station, a COT message configuring the UE with a COT. The method further includes performing, by the UE, an LBT operation based on the LBT configuration message and based on the COT message.

In some other aspects of the disclosure, a method of wireless communication includes transmitting, by a base station to a UE, an LBT configuration message indicating whether Cat2 LBT operations are enabled or disabled for the UE. The method further includes transmitting, by the base station to the UE, a COT message configuring the UE with a COT. The UE performs an LBT operation based on the LBT configuration message and based on the COT message.

In some other aspects, a method of wireless communication includes performing, by a communication device, a first measurement of a first duration during a first portion of a measurement interval associated with an LBT operation to determine a first energy value. The method further includes performing, by the communication device, a second measurement of a second duration during a second portion of the measurement interval to determine a second energy value. The method further includes, based on the first energy value and the second energy value, determining, by the communication device, whether to initiate a transmission associated with the LBT operation.

In some other aspects of the disclosure, a method of wireless communication includes receiving, at a UE from a base station, a configuration message indicating that LBT operations performed by the UE are to be performed based on a category 4 (Cat4) LBT configuration. The method further includes receiving, by the UE from the base station, a grant message scheduling a transmission. The method further includes, based on the grant message, performing, by the UE, one or more LBT operations using the Cat4 LBT configuration.

In some other aspects of the disclosure, a method of wireless communication includes transmitting, to a UE by a base station, a configuration message indicating that LBT operations performed by the UE are to be performed based on a Cat4 LBT configuration. The method further includes transmitting, to the UE by the base station, a grant message scheduling a transmission. The UE performs one or more LBT operations using the Cat4 LBT configuration based on the grant message.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 17 is a flow chart illustrating an example of a method of wireless communication according to some aspects of the disclosure.

FIG. 18 is a flow chart illustrating an example of a method of wireless communication according to some aspects of the disclosure.

DETAILED DESCRIPTION

Figure 1:
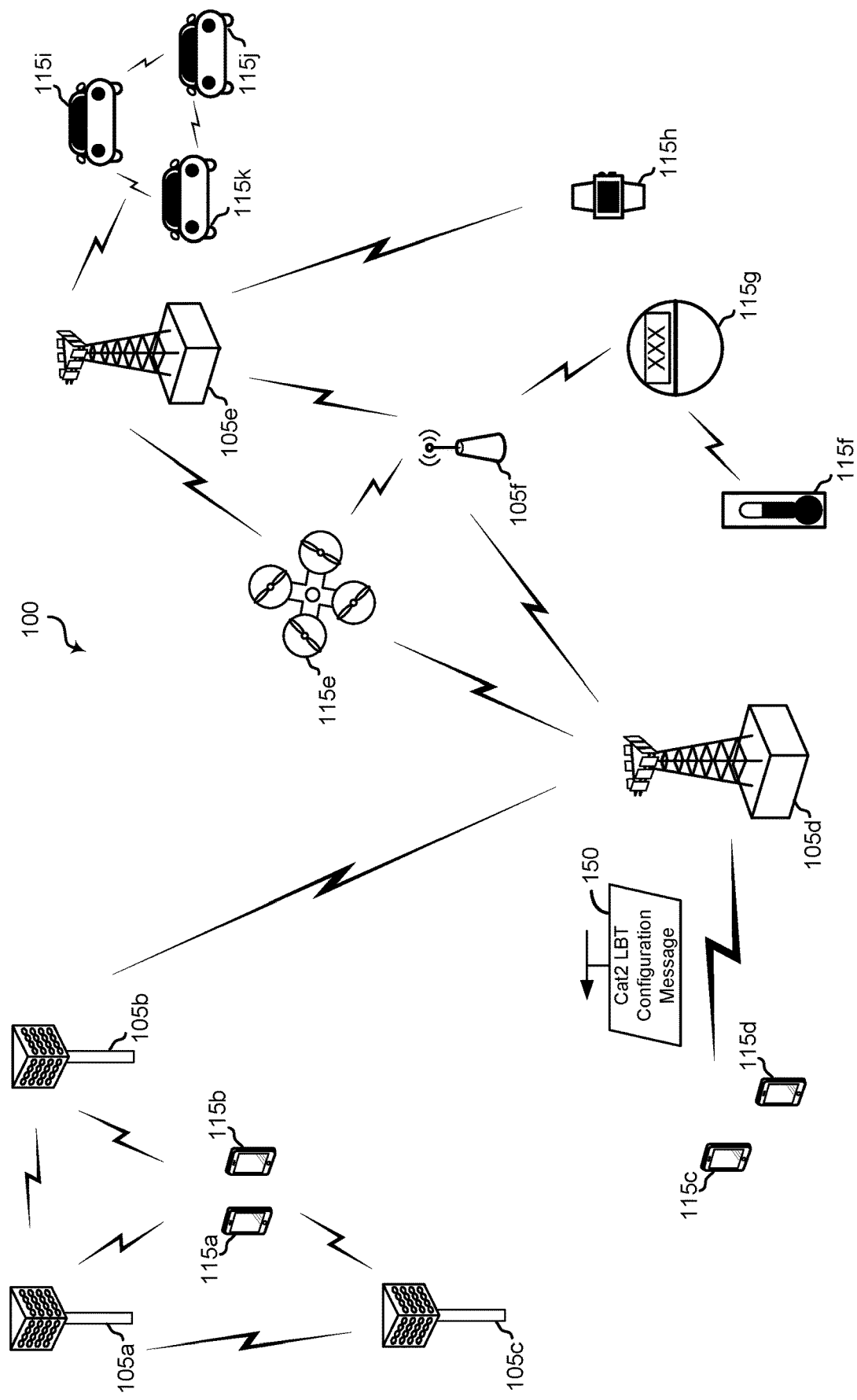
FIG. 1 is a block diagram illustrating an example of a wireless communication system according to some aspects of the disclosure.

Some aspects of the disclosure are related to listen-before-transmit (LBT) configurations for a wireless communications system that operates using an unlicensed high-band frequency spectrum, such as a sixty gigahertz (GHz) frequency spectrum that is shared with another radio access technology (RAT), such as an 802.11 wireless communication protocol. In some aspects, one or more category four (Cat4) LBT configurations may enable simplified LBT operations. For example, multiple measurements may be performed during an LBT operation. The multiple measurements may be performed during particular portions of a deferral interval associated with the LBT operation, during particular portions of a contention interval associated with the LBT operation, or a combination thereof. By performing the multiple measurements during the particular portions, performance may be improved as compared to certain other techniques, such as a single-measurement technique. For example, the measurements may be separated in time to ensure that at least one of the measurements does not fall within a "gap," such as short inter-frame space (SIFS). An example of an SIFS may be a three microsecond SIFS that may be associated with an 802.11ad wireless communication protocol.

Alternatively or in addition, in some aspects, one or more category two (Cat2) LBT configurations may enable simplified LBT operations. For example, a combined duration of portions of a Cat2 LBT measurement interval may correspond to a duration of deferral interval of a Cat4 LBT operation, and a duration of another portion of the Cat2 LBT measurement interval may correspond to a duration of a contention interval of the Cat4 LBT operation. In this case, Cat2 LBT operations and Cat4 LBT operations may have a common duration (such as 13 microseconds). In this case, certain device components may be used for both Cat2 LBT operations and Cat4 LBT operations, reducing device cost and complexity.

To further illustrate, aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

In some aspects of the disclosure, a base station 105 may transmit a category two (Cat2) listen-before-transmit (LBT) configuration message 150 to a particular UE 115 to indicate whether Cat2 LBT operations are enabled or disabled for the particular UE 115. To illustrate, in some examples, the base station 105d may transmit the Cat2 LBT configuration message 150 to the UE 115c to indicate whether Cat2 LBT operations are enabled or disabled for the UE 115c.

Figure 2:
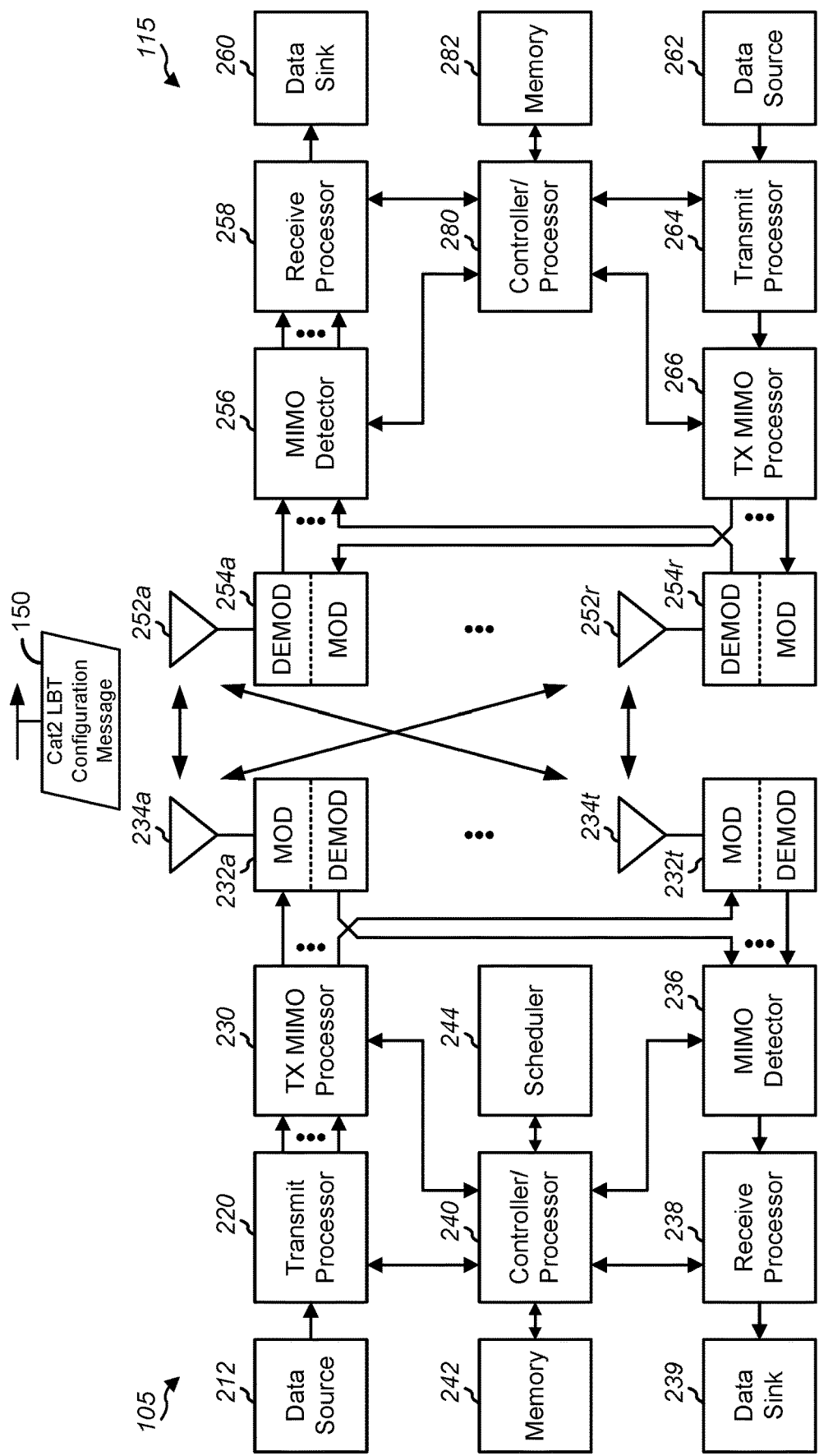
FIG. 2 is a block diagram illustrating examples of a base station and a UE according to some aspects of the disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein, such as transmission of the Cat2 LBT configuration message 150. The controllers/processor 280 and/or other processors and modules at the UE 115 may also perform or direct the execution illustrated in FIGS. 17 and 18 and/or other processes for the techniques described herein, such as reception of the Cat2 LBT configuration message 150. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
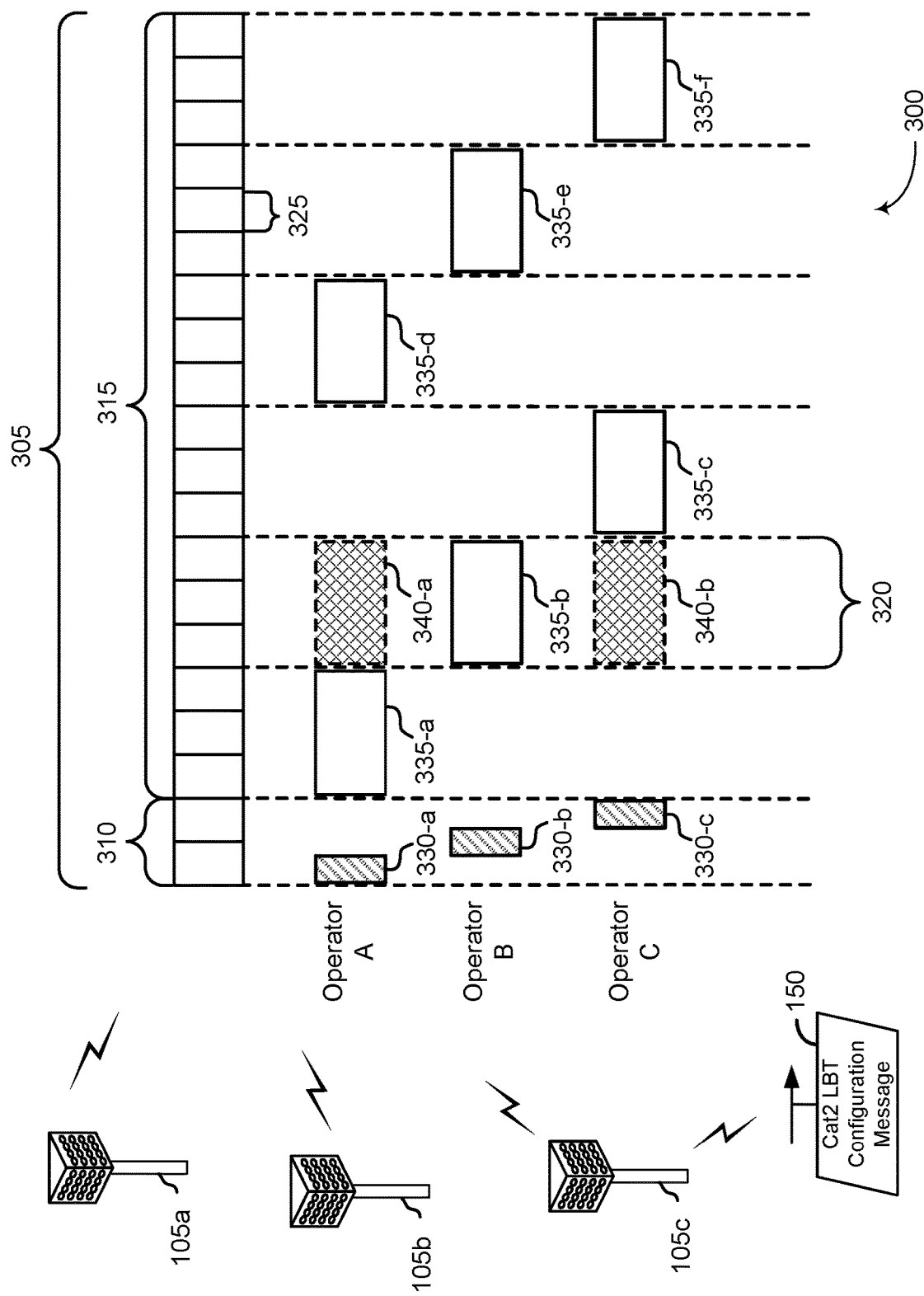
FIG. 3 is a block diagram of an example of a wireless communication system including base stations that use directional wireless beams according to some aspects of the disclosure.

FIG. 3 illustrates an example of a timing diagram 300 for coordinated resource partitioning. In some implementations, one or more aspects of the timing diagram 300 may be used in connection with transmission of the Cat2 LBT configuration message 150.

The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, (e.g., G-INT-OpB), resources 335-*c* (e.g., G-INT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
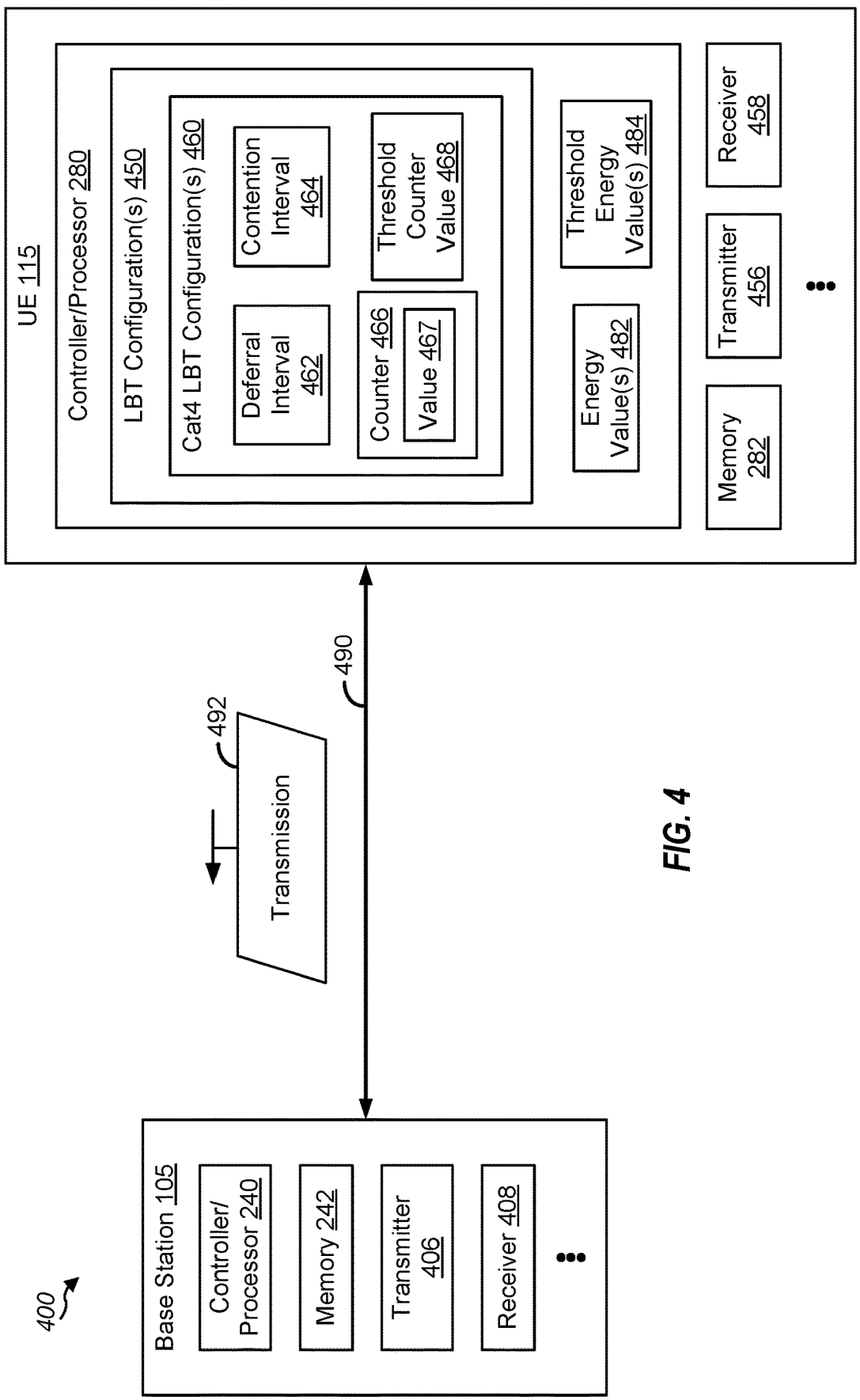
FIG. 4 is a block diagram illustrating an example of a wireless communications system according to some aspects of the disclosure.

FIG. 4 is a block diagram illustrating an example of a wireless communications system 400 according to some aspects of the disclosure. The wireless communications system 400 may include one or more base stations, such as the base station 105. The wireless communications system 400 may include one or more UEs, such as the UE 115.

The example of FIG. 4 illustrates that the base station 105 may include one or more processors (such as the controller/processor 240) and may include the memory 242. The base station 105 may further include a transmitter 406 and a receiver 408. The controller/processor 240 may be coupled to the memory 242, to the transmitter 406, and to the receiver 408. In some examples, the transmitter 406 and the receiver 408 include one or more components described with reference to FIG. 2, such as one or more of the modulator/demodulators 232*a*-*t*, the MIMO detector 236, the receive processor 238, the transmit processor 220, or the TX MIMO processor 230. In some implementations, the transmitter 406 and the receiver 408 may be integrated in one or more transceivers of the base station 105.

The transmitter 406 may be configured to transmit reference signals, synchronization signals, control information, and data to one or more other devices, and the receiver 408 may be configured to receive reference signals, control information, and data from one or more other devices. For example, the transmitter 406 may be configured to transmit signaling, control information, and data to the UE 115, and the receiver 408 may be configured to receive signaling, control information, and data from the UE 115.

FIG. 4 also illustrates that the UE 115 may include one or more processors (such as the controller/processor 280), a memory (such as the memory 282), a transmitter 456, and a receiver 458. The controller/processor 280 may be coupled to the memory 282, to the transmitter 456, and to the receiver 458. In some examples, the transmitter 456 and the receiver 458 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 456 and the receiver 458 may be integrated in one or more transceivers of the UE 115.

The transmitter 456 may be configured to transmit reference signals, synchronization signals, control information, and data to one or more other devices, and the receiver 458 may be configured to receive reference signals, control information, and data from one or more other devices. For example, in some implementations, the transmitter 456 may be configured to transmit signaling, control information, and data to the base station 105, and the receiver 458 may be configured to receive signaling, control information, and data from the base station 105.

In some implementations, one or more of the transmitter 406, the receiver 408, the transmitter 456, or the receiver 458 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 400 operates in accordance with a 5G NR network. For example, the wireless communication system 400 may include multiple 5G-capable UEs 115 and multiple 5G-capable base stations 105, such as UEs and base stations configured to operate in accordance with a 5G NR network protocol such as that defined by the 3GPP.

In some examples, the UE 115 may store data indicating one or more LBT configurations 450. In some examples, the one or more LBT configurations 450 include one or more category 4 (Cat4) LBT configurations 460. The one or more Cat4 LBT configurations 460 may specify a deferral interval 462, a contention interval 464, a counter 466, and a threshold counter value 468. The one or more Cat4 LBT configurations 460 may specify that a value 467 is to be initialized by randomly or pseudo-randomly selecting the value 467 from a set of values. In some examples, the set of values corresponds to the group of zero, one, two, and three. In some other examples, the set of values corresponds to the group of one, two, and three (excluding zero).

During operation, the base station 105 and the UE 115 may communicate using one or more unlicensed frequency bands. One example of an unlicensed frequency band is a sixty gigahertz (GHz) frequency band. Because an unlicensed frequency band may be accessed by devices of other wireless communication systems using different wireless communication protocols, a device of the wireless communications system 400 may perform an LBT operation to determine whether a wireless medium 490 (e.g., one or more wireless channels) is available. In some examples, an LBT operation may be performed according to the LBT configurations 450. An LBT operation may succeed if one or more energy values 482 measured during the LBT operation fail to satisfy (e.g., are less than, or are less than or equal to) one or more threshold energy values 484. An LBT operation may succeed if one or more energy values 482 measured during the LBT operation satisfy (e.g., are greater than or equal to, or are greater than) the one or more threshold energy values 484. In some examples, the UE 115 may initiate a transmission 492 associated with an LBT operation using the wireless medium 490 based on success of the LBT operation. In some other examples, the UE 115 may avoid (or may defer) performing the transmission 492 based on failure of the LBT operation (e.g., until another LBT operation indicates that the wireless medium 490 is available).

Figure 5:
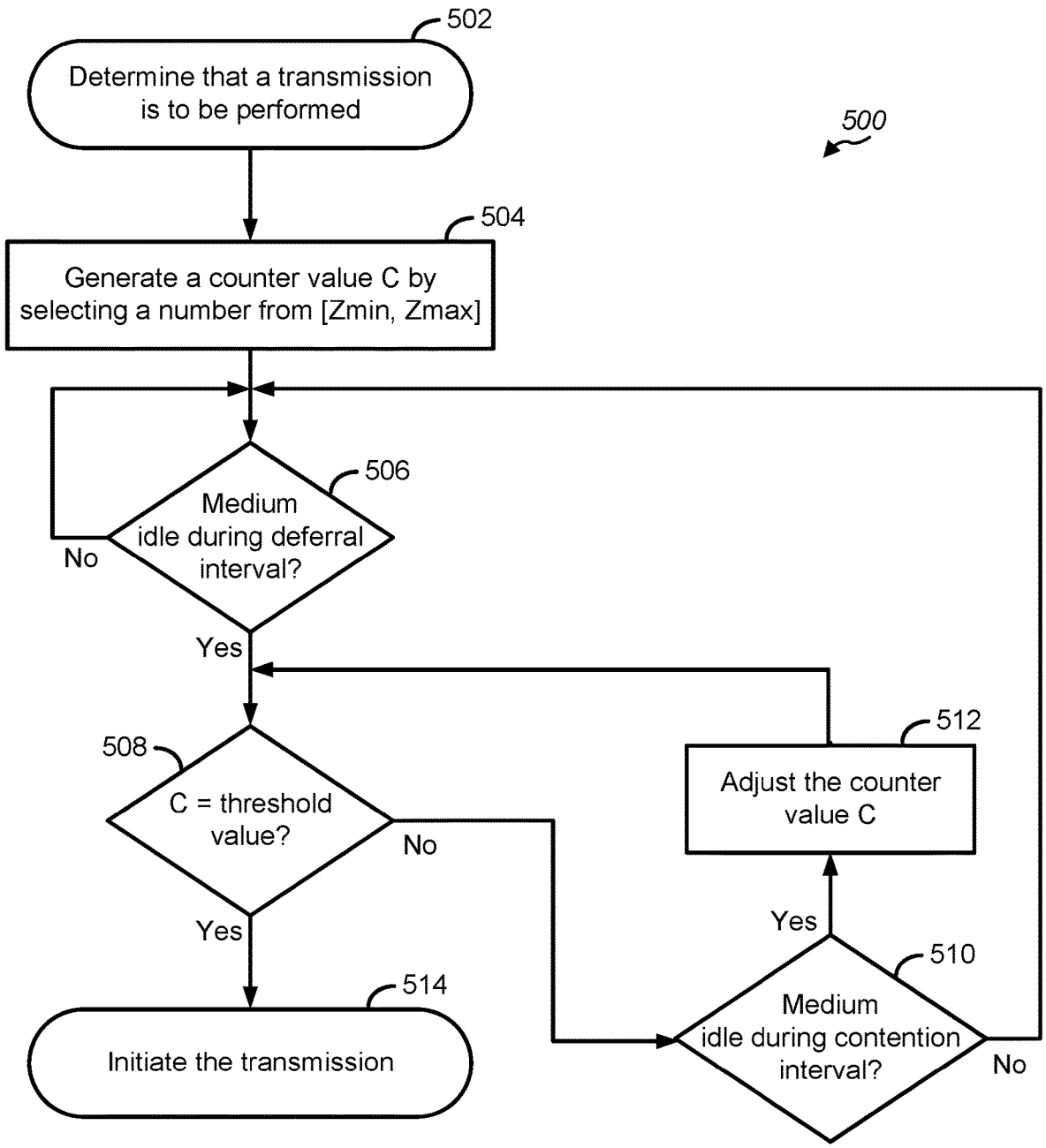
FIG. 5 is a flow chart illustrating example of a category four (Cat4) LBT operation according to some aspects of the disclosure.

FIG. 5 is a flow chart illustrating example of a Cat4 LBT operation 500 according to some aspects of the disclosure. The Cat4 LBT operation 500 may include determining that a transmission is to be performed, at 502. For example, the UE 115 may determine that the transmission 492 is to be performed, such as based on a grant received from the base station 105.

The Cat4 LBT operation 500 may further include generating a counter value C by selecting a number from a range corresponding to [Zmin, Zmax], at 504. The counter value C may correspond to the value 467 of the counter 466. In some examples, the range corresponds to [0, 1, 2, 3] or to [1, 2, 3]. In this case, Zmin and Zmax may correspond to 0 and 3 or to 1 and 3, respectively.

The Cat4 LBT operation 500 may further include determining whether a medium is idle during a deferral interval, at 506. For example, the UE 115 may perform measurements during the deferral interval 462 to determine whether the wireless medium 490 is idle (or occupied). In some examples, the deferral interval 462 has a duration of 8 microseconds. Based on determining the medium is occupied, the Cat4 LBT operation 500 may continue, at 506.

Based on determining the medium is idle, the Cat4 LBT operation 500 may further include determining whether the counter value C corresponds to a threshold value (e.g., zero), at 508. If the counter value C corresponds to the threshold value, the Cat4 LBT operation 500 may further include initiating a transmission, at 514. For example, the UE 115 may perform the transmission 492.

If the counter value C fails to correspond to the threshold value (e.g., is greater than zero), the Cat4 LBT operation 500 may further include determining whether the medium is idle during a contention interval, at 510. For example, the UE 115 may perform measurements during the contention interval 464 to determine whether the wireless medium 490 is idle (or occupied). In some examples, the contention interval 464 has a duration of 5 microseconds. Based on determining the medium is occupied, the Cat4 LBT operation 500 may further include adjusting (e.g., decrementing) the counter value C, at 512. The Cat4 LBT operation 500 may continue, at 508 (e.g., until the counter value C corresponds to the threshold value).

Figure 6:
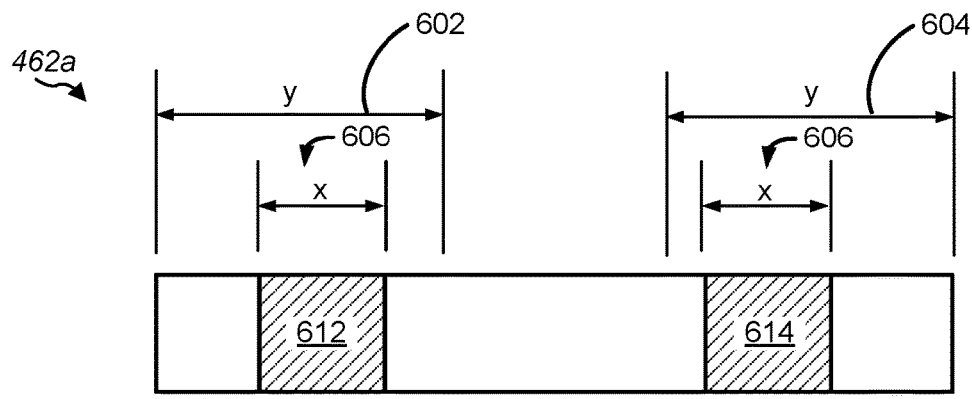
FIG. 6 is a diagram illustrating an example of a deferral interval according to some aspects of the disclosure.

FIG. 6 is a diagram illustrating an example of a deferral interval 462a that may correspond to the deferral interval 462 according to some aspects of the disclosure. The deferral interval 462a may occur after the determining the value 467 of the counter 466. The deferral interval 462a may include a first portion 602 and a second portion 604. The first portion 602 and the second portion 604 may each have a duration "y" (e.g., a particular number of microseconds). The first portion 602 occurs at the beginning of the deferral interval 462a, and the second portion 604 occurs at the end of the deferral interval 462a.

During the first portion 602, the UE 115 may perform a first measurement 612 of a particular duration 606 to determine a first energy value of the one or more energy values 482. During the second portion 604, the UE 115 may perform a second measurement 614 of the particular duration 606 to determine a second energy value of the one or more energy values 482. The particular duration 606 may be referred to as "x" (e.g., a particular number of microseconds), where x≤y.

In some examples, the UE 115 operates based on a wireless communication protocol that specifies that the first measurement 612 may be performed anywhere within the first portion 602 and that the second measurement 614 may be performed anywhere within the second portion 604. To illustrate, in the example of FIG. 6, the first measurement occurs later in the first portion 602 as compared to the second measurement 614 in the second portion 604.

The UE 115 may determine whether to initiate the contention interval 464 based on the first energy value and further based on the second energy value. For example, if the first energy value fails to satisfy a threshold energy value of the one or more threshold energy values 484, and if the second energy value fails to satisfy the threshold energy value, then the UE 115 may initiate the contention interval 464 (e.g., as shown in FIG. 5, at 510). In some other examples, one or both of the first energy value or the second energy value satisfies the threshold energy value, and the UE 115 may reset the deferral interval 462 without initiating the contention interval 464 (e.g., as shown in FIG. 5, at 506).

Figure 7:
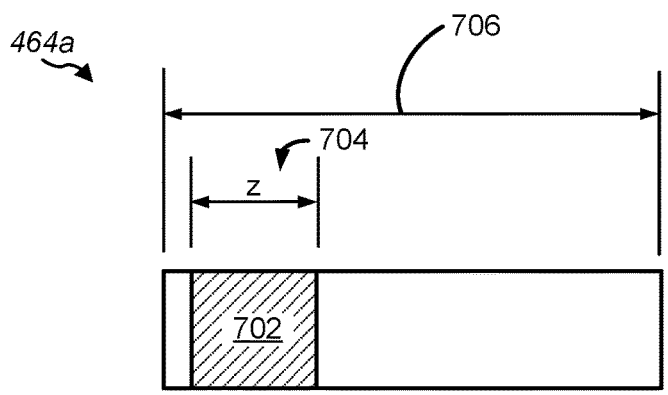
FIG. 7 is a diagram illustrating an example of a contention interval according to some aspects of the disclosure.

FIG. 7 is a diagram illustrating an example of a contention interval 464a that may correspond to the contention interval 464 according to some aspects of the disclosure. In the example of FIG. 7, the contention interval 464a may have a duration 706 (e.g., five microseconds or another duration). The contention interval 464a may occur after determining the value 467 of the counter 466 and after the deferral interval 462.

During the contention interval 464a, the UE 115 may perform a measurement 702 of a particular duration 704 to determine an energy value of the one or more energy values 482. The particular duration 704 may be referred to "z" (e.g., a particular number of microseconds, where z is less than or equal to the duration of the contention interval 464 (e.g., where z≤5 microseconds).

The UE 115 may determine whether to adjust the value 467 of the counter 466 based on the energy value. For example, if the energy value fails to satisfy a threshold energy value of the one or more threshold energy values 484, then the UE 115 may decrement the value 467 of the counter 466 (e.g., as shown in FIG. 5, at 512). In some cases, the UE 115 may initiate the transmission 492 (e.g., as shown in FIG. 5, at 514) in response to determining (e.g., as shown in FIG. 5, at 508) that the value 467 of the counter 466 satisfies the threshold counter value 468. In some other examples, the energy value satisfies the threshold energy value, and the UE 115 re-initiates the deferral interval 462 (e.g., as shown in FIG. 5, at 506).

In some examples, one or more aspects of FIG. 7 are selected to enable the UE to perform the transmission 492 immediately (or nearly immediately) following the end of the contention interval 464a. For example, the measurement 702 may be performed at (or near) the beginning of the contention interval 464a. In this case, if the energy value fails to satisfy the threshold energy value, the UE 115 may use remaining time of the contention interval 464a to initiate the transmission 492 (e.g., by tuning a transceiver or transmitter of the UE 115). In some examples, the particular duration 704 is based on a processing time associated with the UE 115 (such as a processing time used to compare the energy value to the threshold energy value and to tune a transceiver or transmitter of the UE 115). For example, a longer processing time may be associated with a shorter duration 704 (to ensure that the UE 115 has sufficient processing time to perform the transmission 492 immediately, or nearly immediately, following the contention interval 464a).

Figure 8:
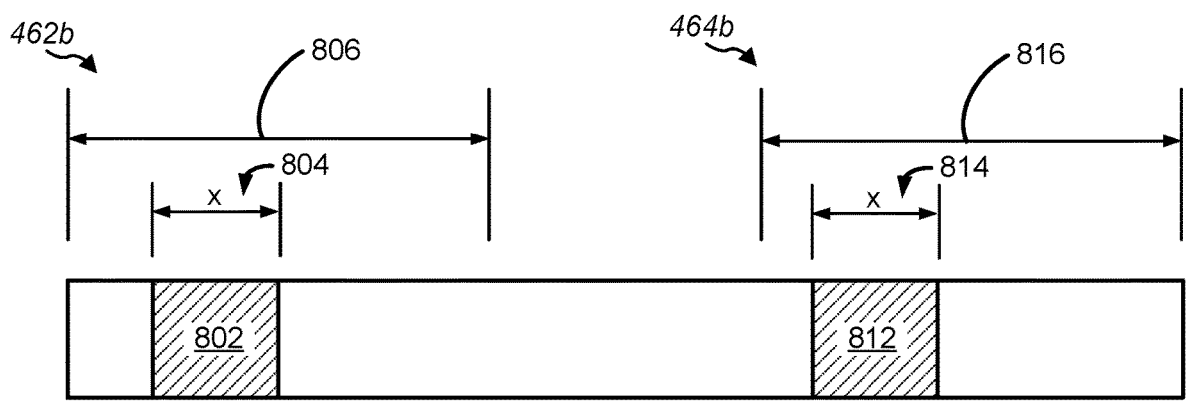
FIG. 8 is a diagram illustrating an example of a deferral interval and an example of a contention interval according to some aspects of the disclosure.

FIG. 8 is a diagram illustrating an example of a deferral interval 462b that may correspond to the deferral interval 462 and an example of a contention interval 464b that may correspond to the contention interval 464 according to some aspects of the disclosure. The deferral interval 462b may occur after the determining the value 467 of the counter 466. The contention interval 464b may occur after determining the value 467 of the counter 466 and after the deferral interval 462b. In the example of FIG. 8, the deferral interval 462b may have a duration 806 (e.g., eight microseconds or another duration), and the contention interval 464b may have a duration 816 (e.g., five microseconds or another duration).

The UE 115 may perform a first measurement 802 of a first duration 804 to determine a first energy value of the one or more energy values 482. During the contention interval 464b, the UE 115 may perform a second measurement 812 of a second duration 814 to determine a second energy value. The UE 115 may perform the second measurement 812 based on the first energy value, such as based on determining that the first energy value fails to satisfy a first threshold energy value of the one or more threshold energy values 484.

The UE 115 may determine whether to adjust the value 467 of the counter 466 based on the second energy value. For example, if the second energy value fails to satisfy a second threshold energy value of the one or more threshold energy values 484, the UE 115 may adjust the value 467 of the counter 466 (e.g., as shown in FIG. 5, at 512). The UE 115 may initiate the transmission 492 in response to determining that the value 467 of the counter 466 satisfies the threshold counter value 468. In some other examples, the second energy value satisfies the second threshold energy value, and the UE 115 re-initiates the deferral interval 462a (e.g., as shown in FIG. 5, at 506).

As described above, in some implementations, the value 467 of the counter 466 may be randomly or pseudo-randomly selected from a group of values, such as the group of values of zero, one, two, and three. In some other implementations, the value 467 of the counter 466 is randomly selected from the group of values including one, two, and three, and zero is excluded from the group of values. For example, the base station 105 and the UE 115 may operate based on a wireless communication protocol that specifies that zero is not an allowed initial value of the counter 466. In some other implementations, zero is an allowed initial value of the counter 466 in connection with a particular LBT configuration of the one or more Cat4 LBT configurations 460, such as described further with reference to the examples of FIGS. 9 and 10.

Figure 9:
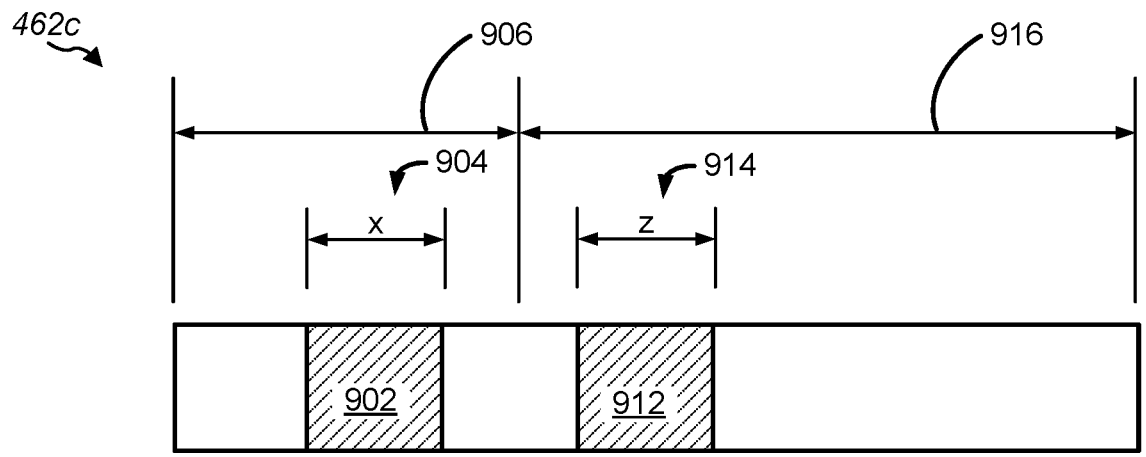
FIG. 9 is a diagram illustrating an example of a deferral interval according to some aspects of the disclosure.

FIG. 9 is a diagram illustrating an example of a deferral interval 462c that may correspond to the deferral interval 462 according to some aspects of the disclosure. In the example of FIG. 7, the deferral interval 462c may have a duration of eight microseconds. The deferral interval 462c may occur after determining the value 467 of the counter 466 and after the deferral interval 462.

During the deferral interval 462c, the UE 115 may perform a first measurement 902 of a first duration 904 during a first portion 906 of the deferral interval 462c to determine a first energy value of the one or more energy values 482. During a second portion 916 of the deferral interval 462c, the UE 115 may perform a second measurement 912 of a second duration 914 to determine a second energy value of the one or more energy values 482. In some examples, the first portion 906 may have a duration of three microseconds, and the second portion 916 may have a duration of five microseconds. In this case, the first portion 906 has a different duration than the second portion 916. In some other examples, a duration of the first portion 906 corresponds to a duration of the second portion 916 (such as if each duration is four microseconds).

The UE 115 may determine whether to initiate the contention interval 464 subsequent to the deferral interval 462c based on the first energy value and the second energy value. For example, if the first energy value fails to satisfy a threshold energy value of the one or more threshold energy values 484, and if the second energy value fails to satisfy the threshold energy value, then the UE 115 may initiate the contention interval 464 (e.g., as shown in FIG. 5, at 510). In some other examples, one or both of the first energy value or the second energy value satisfies the threshold energy value, and the UE 115 may reset the deferral interval 462 without initiating the contention interval 464 (e.g., as shown in FIG. 5, at 506).

In some examples, the base station 105 and the UE 115 operate based on a wireless communication protocol that specifies that the first measurement 902 may occur anywhere within the first portion 906 and that the second measurement 912 may occur anywhere within the second portion 916, and the second portion 916 occupies a remainder of the deferral interval 462c following the first portion 906. As an example, if the deferral interval 462 is eight microseconds and if the first portion 906 is three microseconds, then the second portion 916 may occupy the remainder of five microseconds of the deferral interval 462c.

In some other examples, the base station 105 and the UE 115 operate based on a wireless communication protocol that specifies that the first measurement 902 may occur anywhere within the first portion 906 and that the second measurement 912 may occur anywhere within the second portion 916, where the second portion excludes a gap portion that occurs at the end of the deferral interval.

Figure 10:
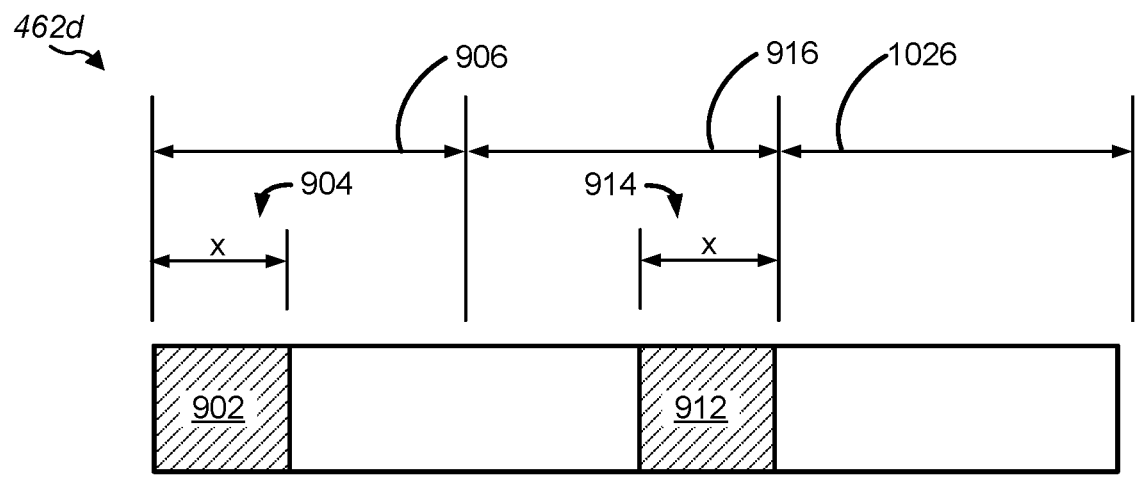
FIG. 10 is a diagram illustrating an example of a deferral interval that includes a gap portion that occurs at the end of the deferral interval according to some aspects of the disclosure.

For example, FIG. 10 is a diagram illustrating an example of a deferral interval 462d that includes a gap portion 1026 that occurs at the end of the deferral interval 462d according to some aspects of the disclosure. In some implementations, the first duration 904 and the second duration 914 of the deferral interval 462d may each correspond to x microseconds. In some other implementations, the first duration 904 may correspond to x microseconds, and the second duration 914 may correspond to z microseconds.

Figure 11:
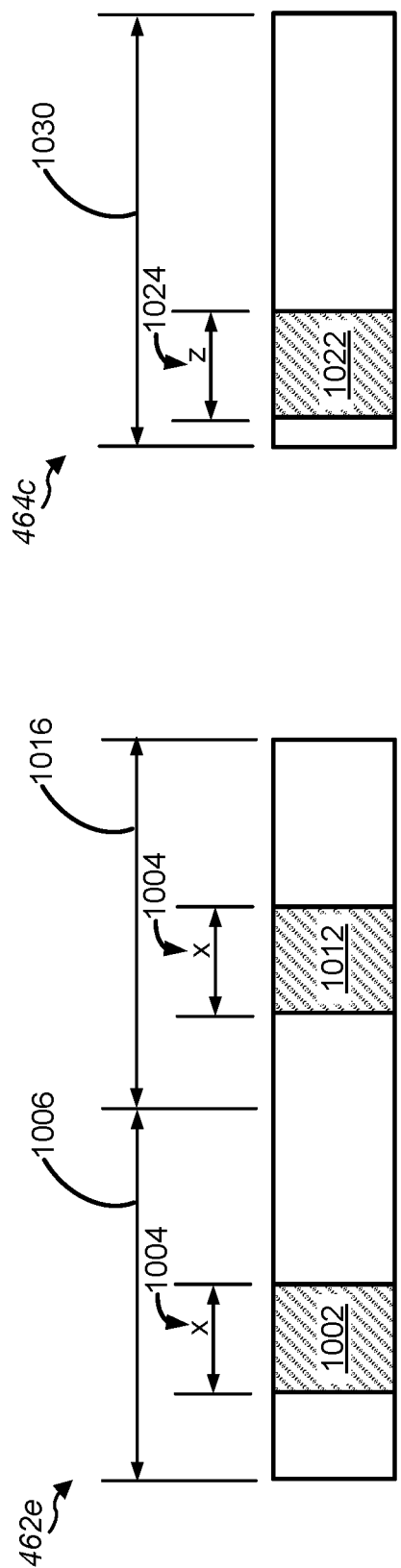
FIG. 11 is a diagram illustrating an example of a deferral interval and an example of a contention interval according to some aspects of the disclosure.

FIG. 11 is a diagram illustrating an example of a deferral interval 462e that may correspond to the deferral interval 462 and an example of a contention interval 464c that may correspond to the contention interval 464 according to some aspects of the disclosure. The deferral interval 462e may occur after the determining the value 467 of the counter 466. The contention interval 464c may occur after determining the value 467 of the counter 466 and after the deferral interval 462e. In some examples, the deferral interval 462e may have a duration of ten microseconds (or another duration), and the contention interval 464c may have a duration 1030 of five microseconds (or another duration).

During a first half 1006 of the deferral interval 462e, the UE 115 may perform a first measurement 1002 of a particular duration 1004 to determine a first energy value of the one or more energy values 482. During a second half 1016 of the deferral interval 462e subsequent to the first half 1006, the UE 115 may perform a second measurement 1012 of the particular duration 1004 to determine a second energy value. In the example of FIG. 11, the first half 1006 and the second half 1016 each have a duration of 5 microseconds.

The UE 115 may determine whether to initiate the contention interval 464c based on the first energy value and further based on the second energy value. In response to initiating the contention interval 464c, the UE 115 may perform a third measurement 1022 of a second duration 1024 during the contention interval 464c to determine a third energy value. The UE 115 may determine whether to initiate the transmission 492 based on the third energy value.

In the example of FIG. 11, a first length of the deferral interval 462e is an integer multiple of a second length of the contention interval 464c. To illustrate, FIG. 11 illustrates that the first length may be 10 microseconds, and the second length may be five microseconds. In this example, the first length is twice the second length.

In some aspects of the disclosure, the UE 115 may determine a self-deferral interval. As used herein, a self-deferral interval may correspond to a time period after which the UE detects that the value 467 of the counter 466 satisfies the threshold counter value 468 and during which the UE 115 avoids (or defers) performing the transmission 492 based on determining that one or more transmission criteria are not satisfied. In some implementations, the one or more transmission criteria are based on a transmission boundary associated with the transmission 492 (e.g., a start time of the transmission 492) failing to align with a slot boundary or with a symbol boundary (e.g., where the transmission boundary occurs in the middle of a slot or in the middle of a symbol).

In some aspects of the disclosure, based on detecting that the one or more transmission criteria are not satisfied, the UE 115 may perform a one-shot LBT operation (such as a category 2 (Cat2) LBT operation or another LBT operation that is distinct from a Cat4 LBT operation) prior to the transmission boundary associated with the transmission 492. Based on success of the one-shot LBT operation, the UE 115 may perform the transmission 492.

In one example, the one-shot LBT operation is performed in accordance with the example of FIG. 8 (e.g., by performing two measurements each having the first duration 804, where one measurement occurs within an eight microsecond interval and where the other measurement occurs within a five microsecond interval). In this case, the on-shot LBT operation may include a first measurement performed within a first interval (e.g., an eight microsecond interval) that occurs prior to the transmission boundary and may further include a second measurement performed within a second interval (e.g., a five microsecond interval) that occurs after the first interval and prior to the transmission boundary, where a duration of the first interval is greater than a duration of the second interval.

In some other examples, the one-shot LBT operation is performed in accordance with the example of FIG. 9 or the example of FIG. 10 (e.g., by performing two measurements within an eight microsecond interval). In this example, the one-shot LBT operation may include a first measurement performed within an interval that occurs prior to the transmission boundary and may further include a second measurement performed within the interval.

In some additional examples, the one-shot LBT operation is performed in accordance with the example of FIG. 11 (e.g., by performing one measurement during the first half of a 10 microsecond interval and by performing another measurement during the second half of the 10 microsecond interval). In this example, the one-shot LBT operation may include a first measurement performed during a first half of an interval that occurs prior to the transmission boundary and may further include a second measurement performed during a second half of the interval.

Figure 12:
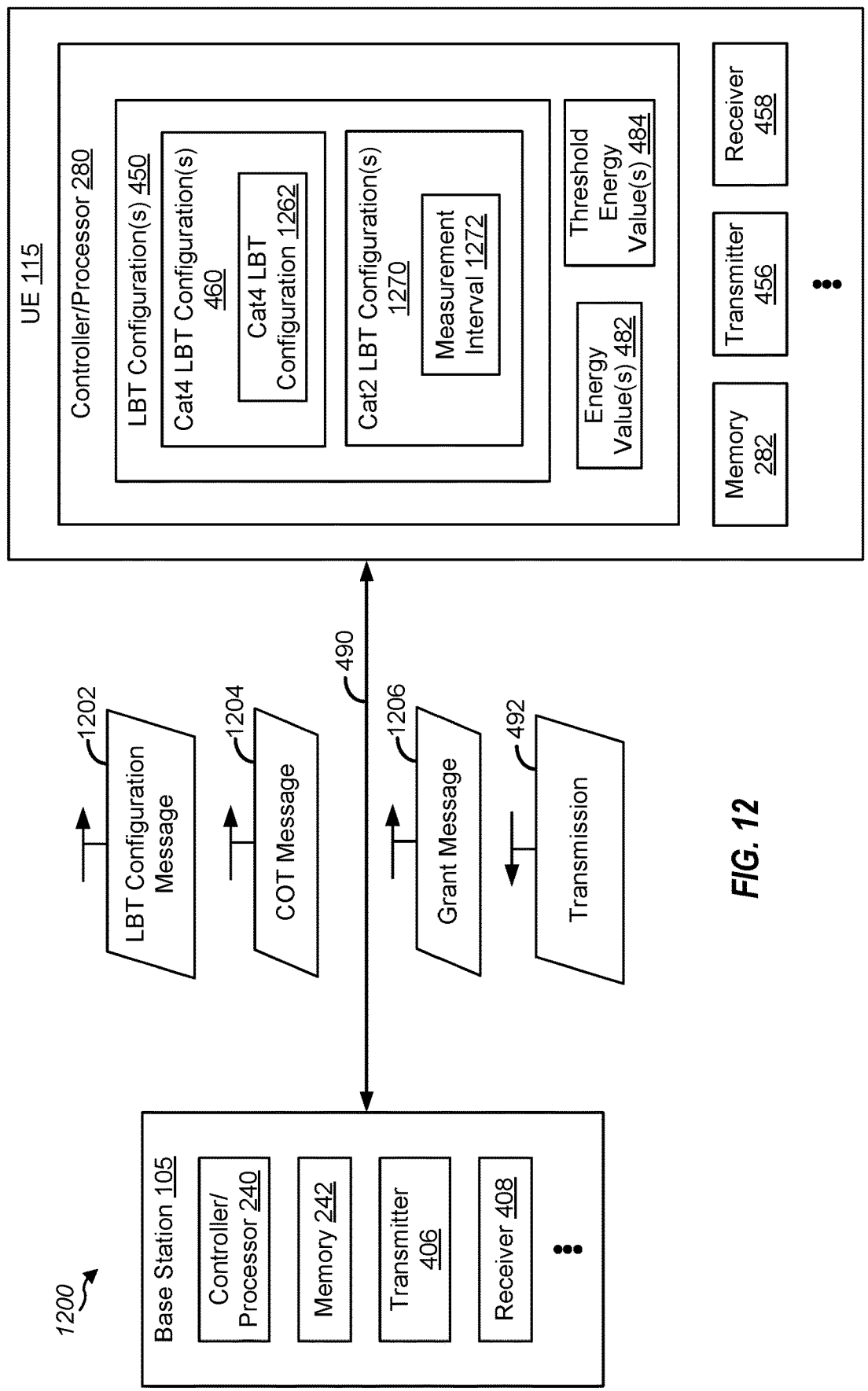
FIG. 12 is a block diagram illustrating an example of a wireless communications system according to some aspects of the disclosure.

FIG. 12 is a block diagram illustrating an example of a wireless communications system 1200 according to some aspects of the disclosure. The wireless communications system 1200 may include one or more base stations, such as the base station 105. The wireless communications system 1200 may include one or more UEs, such as the UE 115.

In some examples, the UE 115 may store data indicating the one or more LBT configurations 450. The one or more LBT configurations 450 may include one or more category 2 (Cat2) LBT configurations 1270 (alternatively or in addition to the one or more Cat4 LBT configurations 460). The one or more Cat2 LBT configurations 1270 may specify a measurement interval 1272. Although FIG. 12 depicts that the UE 115 stores data indicating the one or more LBT configurations 450, LBT operations may also be performed by the base station 105 (alternatively or in addition to the UE 115).

During operation, the base station 105 may transmit to the UE 115 an LBT configuration message 1202 (e.g., the Cat2 LBT configuration message 150 or another LBT configuration message) indicating whether category 2 (Cat2) LBT operations are enabled or disabled for the UE 115. For example, the LBT configuration message 1202 may include one or more bits having either a first value (such as a logic zero value or a logic one value) indicating that Cat2 LBT operations are enabled for the UE 115 or a second value (such as a logic one value or a logic zero value) indicating that Cat2 LBT operations are disabled for the UE 115. In some examples, the LBT configuration message 1202 has a radio resource control (RRC) configuration format. In some other examples, the LBT configuration message 1202 is included in a system information block (SIB) transmitted by the base station 105 or in a remaining minimum system information (RMSI) message transmitted by the base station 105.

The base station 105 may also transmit to the UE 115 a channel occupancy time (COT) message 1204 configuring the UE 115 with a COT. The COT may correspond to a time interval during which the UE 115 is scheduled to transmit to the base station 105 using the wireless medium 490 (conditioned on a successful LBT operation indicating availability of the wireless medium 490).

The UE 115 may perform an LBT operation based on the LBT configuration message 1202 and based on the COT message 1204. In some examples, the LBT operation is a Cat2 LBT operation based on the LBT configuration message 1202 indicating that Cat2 LBT operations are enabled for the UE 115. In this case, the UE 115 may perform the LBT operation based on the one or more Cat2 LBT configurations 1270. In some other examples, the LBT operation is another LBT operation (such as a Cat4 LBT operation) based on the message indicating that the Cat2 LBT operations are disabled for the UE 115. For example, the LBT operation may correspond to a Cat4 operation that is performed according to the one or more LBT configurations 450. The UE 115 may perform the LBT operation prior to a scheduled transmission boundary of the transmission 492. The UE 115 may perform the transmission 492 based on success of the LBT operation.

In some implementations, the UE 115 supports multiple types of Cat2 LBT operations. To illustrate, the multiple types may include a type 2A Cat2 LBT type and a type 2B Cat2 LBT type. The LBT configuration message 1202 (or another configuration received by the UE 115) may configure the UE 115 with one or more of the multiple types of the Cat2 LBT operations. As illustrative examples, the UE 115 may be configured with type 2A Cat2 LBT operations but not type 2B Cat2 LBT operations, with type 2B Cat2 LBT operations but not type 2A Cat2 LBT operations, or with both type 2A Cat2 LBT operations and type 2B Cat2 LBT operations.

In some examples, the LBT configuration message 1202 (or another configuration message) may indicate that LBT operations performed by the UE 115 are to be performed based on a Cat4 LBT configuration 1262 (such as one of the Cat4 LBT configurations 460). In this case, the UE 115 may perform one or more LBT operations using the Cat4 LBT configuration 1262 (e.g., instead of using a Cat2 LBT configuration). For example, the UE 115 may receive, from the base station 105, a grant message 1206 scheduling the transmission 492, and the UE 115 may perform an LBT operation based on the grant message 1206 and using the Cat4 LBT configuration 1262. In some examples, the grant message 1206 may indicate a transmission time of the transmission 492, and the UE 115 may perform the transmission 492 at the transmission time based on success of the LBT operation.

In some examples, the Cat4 LBT configuration 1262 is associated with a random or pseudo-random selection of a number of instances of the contention interval 464. For example, as described with reference to FIGS. 4 and 5, the contention interval 464 may occur (e.g., at 510) based on the value 467 of the counter 466, which may be randomly or pseudo-randomly selected from a group of values, such as zero, one, two, and three. In some examples, the base station 105 transmits the grant message 1206 (or the UE 115 receives the grant message 1206) at a time selected to enable the deferral interval 462 and a particular number of instances of the contention interval 464 prior to the transmission time of the transmission 492. For example, the particular number may correspond to three. In this case, the UE 115 may be enabled to perform an LBT operation using the Cat4 LBT configuration 1262 even in a "worst case" scenario, such as if the value 467 corresponds to three (in which case the LBT operation may take more time as compared to another value, such as zero, one, or two).

Figure 13:
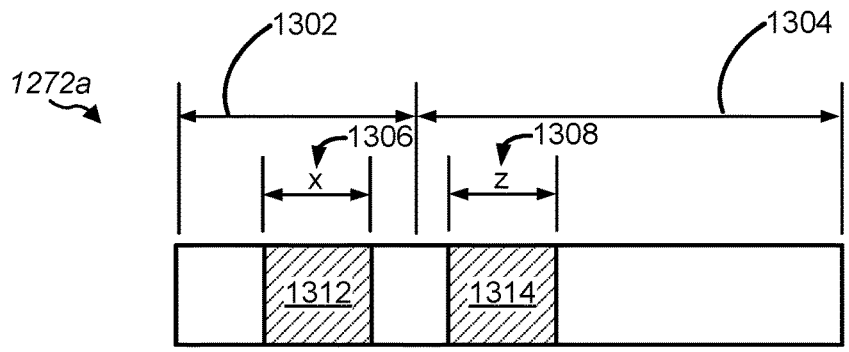
FIG. 13 is a diagram illustrating an example of a measurement interval according to some aspects of the disclosure.

FIG. 13 is a diagram illustrating an example of a measurement interval 1272a that may correspond to the measurement interval 1272 according to some aspects of the disclosure. In connection with a LBT operation, the UE 115 may perform a first measurement 1312 of a first duration 1306 during a first portion 1302 of the measurement interval 1272a to determine a first energy value of the one or more energy values 482. The UE 115 may perform a second measurement 1314 of a second duration 1308 during a second portion 1304 of the measurement interval to determine a second energy value of the one or more energy values 482. The UE 115 may determine, based on the first energy value and the second energy value, whether to initiate the transmission 492. In some examples, the measurement interval 1272a has a duration of eight microseconds, and the LBT operation is a category 2 (Cat2) LBT operation. In the example of FIG. 12, the first portion 1302 is three microseconds, and the second portion 1304 is five microseconds.

In one example, the base station 105 and the UE 115 operate based on a wireless communication protocol that specifies the first portion 1302 and the second portion 1304. The wireless communication protocol may further specify that the first measurement 1312 may occur anywhere within the first portion 1302 and that the second measurement 1314 may occur anywhere within the second portion 1304.

Figure 14:
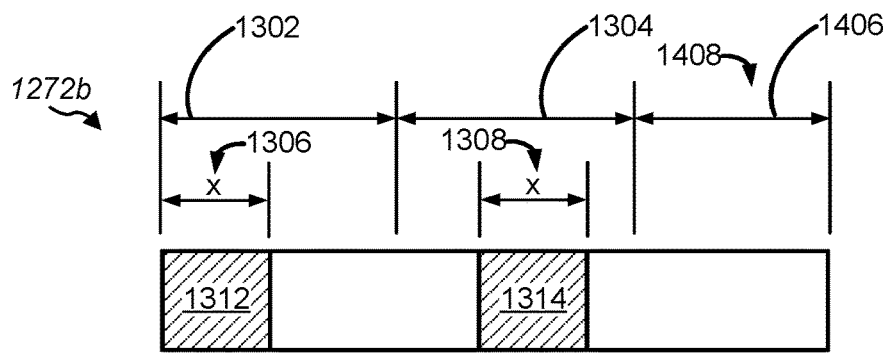
FIG. 14 is a diagram illustrating an example of a measurement interval according to some aspects of the disclosure.

FIG. 14 is a diagram illustrating an example of a measurement interval 1272b that may correspond to the measurement interval 1272 according to some aspects of the disclosure. In the example of FIG. 14, the measurement interval 1272b includes the first portion 1302, the second portion 1304, and a gap portion 1406 following the second portion and having a third duration. In the example of FIG. 14, the first duration 1306 is 2.5 microseconds, the second duration 1308 is 2.5 microseconds, and the third duration 1408 is three microseconds. In an example, the base station 105 and the UE 115 operate based on a wireless communication protocol that specifies the first portion 1302, the second portion, 1304, and the gap portion 1406 following the second portion 1304 and having the third duration 1408. As illustrated in the example of FIG. 14, the wireless communication protocol may further specify that the first duration 1306 corresponds to the second duration 1308.

Figure 15:
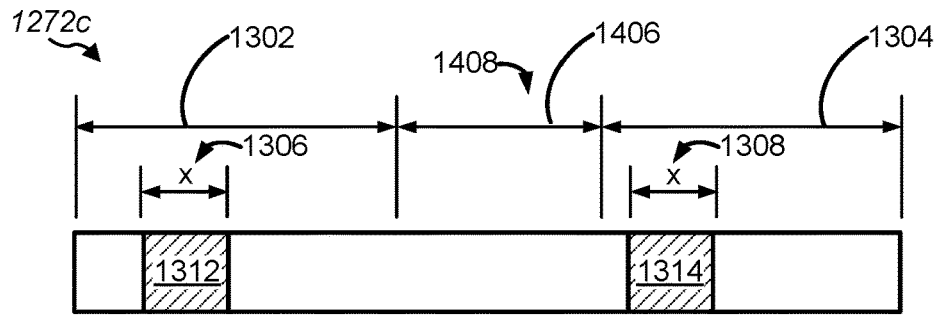
FIG. 15 is a diagram illustrating an example of a measurement interval according to some aspects of the disclosure.

FIG. 15 is a diagram illustrating an example of a measurement interval 1272c that may correspond to the measurement interval 1272 according to some aspects of the disclosure. In the example of FIG. 14, the gap portion 1406 separates the first portion 1302 and the second portion 1304. In some examples, a length of the measurement interval 1272c is configurable (e.g., by the base station 105 or by the UE 115) by selecting a particular number of instances of the second portion 1304 within the measurement interval 1272c. To illustrate, in some implementations, one instance of the second portion 1304 configures the length as 13 microseconds, two instances of the second portion 1304 configure the length as 18 microseconds, and three instances of the second portion 1304 configure the length as 23 microseconds.

In some examples, the particular number is configurable by the base station 105 using an RRC configuration message, which may correspond to the LBT configuration message 1202 or another configuration message. In another example, the particular number is specified by a configuration of a hardware component or operating system of the UE 115 (e.g., where the particular is "hard coded" into the UE 115).

In some aspects, the particular number is selected to reduce a hardware complexity of the UE 115. For example, a combined duration of the first portion 1302 and the gap portion 1406 may correspond to a duration of deferral interval of a Cat4 LBT operation (e.g., the deferral interval 462), and a duration of the second portion 1304 may correspond to a duration of a contention interval (e.g., the contention interval 464) of the Cat4 LBT operation. In this case, Cat2 LBT operations and Cat4 LBT operations may have a common duration (such as 13 microseconds). In this case, certain components of the UE 115 may be used for both Cat2 LBT operations and Cat4 LBT operations, reducing cost and complexity of the UE 115.

Figure 16:
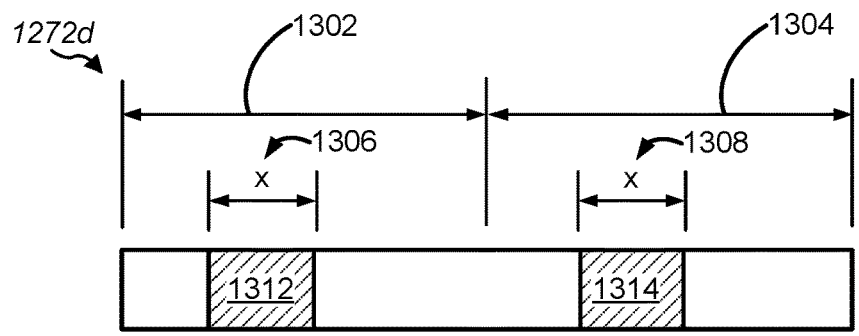
FIG. 16 is a diagram illustrating an example of a measurement interval according to some aspects of the disclosure.

FIG. 16 is a diagram illustrating an example of a measurement interval 1272d that may correspond to the measurement interval 1272 according to some aspects of the disclosure. In the example of FIG. 16, the measurement interval 1272d has a duration of ten microseconds. In FIG. 16, the first portion 1302 corresponds to a first half of the measurement interval 1272d, the second portion 1304 corresponds to a second half of the measurement interval 1272d, and the first duration 1306 corresponds to the second duration 1308.

In FIGS. 12-16, the UE 115 may determine of an LBT operation based on the first energy value failing to satisfy a threshold energy value of the one or more energy values 482 and further based on the second energy value failing to satisfy the threshold energy value. The UE 115 may determine failure of the LBT operation based on one or both of the first energy value of the second energy value satisfying the threshold energy value.

Although certain examples are described herein with reference to the UE 115, it is noted that such operations may be performed by one or more other devices, such as the base station 105. For example, in some implementations, the base station 105 may perform an LBT operation according to the one or more Cat4 LBT configurations 460, an LBT operation according to the one or more Cat2 LBT configurations 1270, or both.

FIG. 17 is a flow chart illustrating an example of a method 1700 of wireless communication according to some aspects of the disclosure. In some examples, the method 1700 is performed by a UE, such as the UE 115. In some other examples, the method 1700 may be performed by a base station, such as the base station 105.

The method 1700 includes determining, by a communication device, a value of a counter associated with an LBT operation, at 1702. For example, the UE 115 may determine the value 467 of the counter 466, such as by randomly or pseudo-randomly selecting the value 467 from a group of values.

The method 1700 further includes, after determining the value of the counter and during a first portion of a deferral interval associated with the LBT operation, performing a first measurement of a particular duration to determine a first energy value, at 1704. In one example, the UE 115 performs the first measurement 612 during the first portion 602 of the deferral interval 462a to determine the first energy value.

The method 1700 further includes, during a second portion of the deferral interval subsequent to the first portion, performing a second measurement of the particular duration to determine a second energy value, at 1706. In one example, the UE 115 performs the second measurement 614 during the second portion 604 of the deferral interval 462a to determine the second energy value.

The method 1700 further includes determining whether to initiate a contention interval associated with the LBT operation based on the first energy value and further based on the second energy value, at 1708. For example, if the first energy value fails to satisfy the threshold energy value, and if the second energy value fails to satisfy the threshold energy value, then the UE 115 may initiate the contention interval 464 (e.g., as shown in FIG. 5, at 510). In some other examples, one or both of the first energy value or the second energy value satisfies the threshold energy value, and the UE 115 may reset the deferral interval 462 without initiating the contention interval 464 (e.g., as shown in FIG. 5, at 506).

FIG. 18 is a flow chart illustrating an example of a method 1800 of wireless communication according to some aspects of the disclosure. In some examples, the method 1800 is performed by a UE, such as the UE 115.

The method 1800 includes receiving, by a UE from a base station, an LBT configuration message indicating whether Cat2 LBT operations are enabled or disabled for the UE, at 1802. For example, the UE 115 may receive the LBT configuration message 1202 from the base station 105 indicating whether Cat2 LBT operations are enabled or disabled for the UE 115.

The method 1800 further includes receiving, by the UE from the base station, a COT message configuring the UE with a COT, at 1804. For example, the UE 115 may receive the COT message 1204 from the base station 105.

The method 1800 further includes performing, by the UE, an LBT operation based on the LBT configuration message and based on the COT message, at 1806. For example, the UE 115 may perform an LBT operation based on the LBT configuration message 1202 and based on the COT message 1204.

Figure 19:
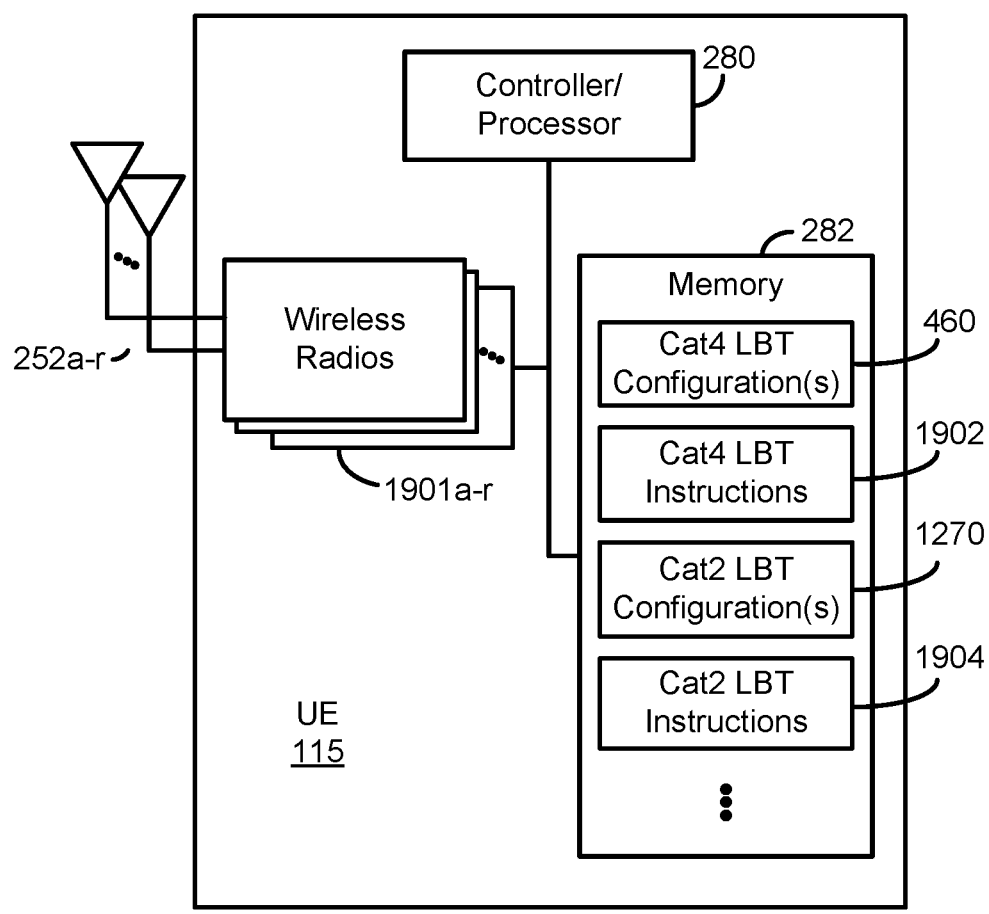
FIG. 19 is a block diagram illustrating an example of a UE according to some aspects of the disclosure.

FIG. 19 is a block diagram illustrating an example of a UE 115 according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 1901a-r and antennas 252a-r. The wireless radios 1901a-r may include one or more components or devices described herein, such as the modulator/demodulators 254a-r, the MIMO detector 256, the receive processor 258, the transmit processor 264, the TX MIMO processor 266, one or more other components or devices, or a combination thereof.

In some examples, the controller/processor 280 executes Cat4 LBT instructions 1902 to initiate, perform, or control operations of an LBT operation based on the one or more Cat4 LBT configurations 460. Alternatively or in addition, the controller/processor 280 may execute Cat2 LBT instructions 1904 to initiate, perform, or control operations of an LBT operation based on the one or more Cat2 LBT configurations 1270.

Figure 20:
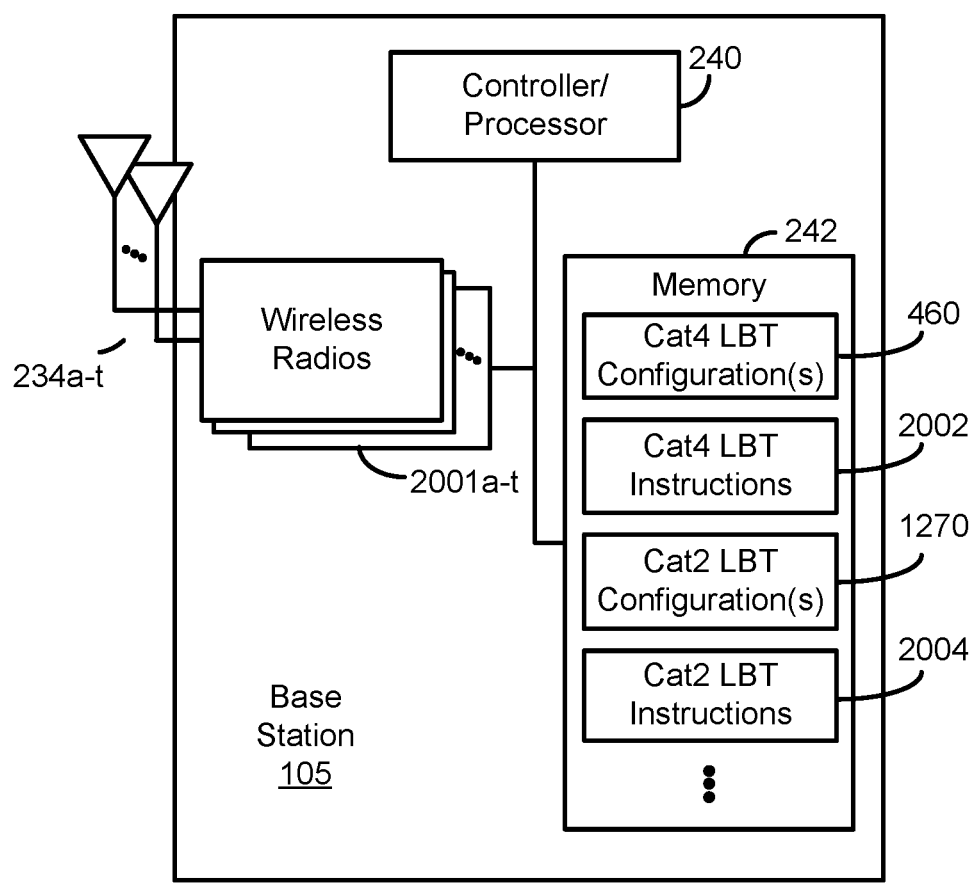
FIG. 20 is a block diagram illustrating an example of a base station according to some aspects of the disclosure.

FIG. 20 is a block diagram illustrating an example of a base station according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 2001a-t and antennas 234a-t. The wireless radios 2001a-t may include one or more components or devices described herein, such as the modulator/demodulators 232a-t, the MIMO detector 236, the receive processor 238, the transmit processor 220, the TX MIMO processor 230, one or more other components or devices, or a combination thereof.

In some examples, the controller/processor 240 executes Cat4 LBT instructions 2002 to initiate, perform, or control operations of an LBT operation based on the one or more Cat4 LBT configurations 460. Alternatively or in addition, the controller/processor 240 may execute Cat2 LBT instructions 2004 to initiate, perform, or control operations of an LBT operation based on the one or more Cat2 LBT configurations 1270.

According to some further aspects, in a first aspect, a method of wireless communication includes determining, by a communication device, a value of a counter associated with an LBT operation. The method further includes, after determining the value of the counter and during a first portion of a deferral interval associated with the LBT operation, performing a first measurement of a particular duration to determine a first energy value. The method further includes, during a second portion of the deferral interval subsequent to the first portion, performing a second measurement of the particular duration to determine a second energy value. The method also includes determining whether to initiate a contention interval associated with the LBT operation based on the first energy value and further based on the second energy value.

In a second aspect alternatively or in addition to the first aspect, the first energy value fails to satisfy a threshold energy value, the second energy value fails to satisfy the threshold energy value, and the method includes initiating the contention interval.

In a third aspect alternatively or in addition to one or more of the first through second aspects, one or both of the first energy value or the second energy value satisfies a threshold energy value, and the method includes resetting the deferral interval without initiating the contention interval.

In a fourth aspect alternatively or in addition to one or more of the first through third aspects, the first portion occurs at the beginning of the deferral interval, and the second portion occurs at the end of the deferral interval.

In a fifth aspect alternatively or in addition to one or more of the first through fourth aspects, a method of wireless communication includes determining, by a communication device, a value of a counter associated with a LBT operation. The method further includes, after a deferral interval associated with the LBT operation and during a contention interval associated with the LBT operation, performing a measurement of a particular duration to determine an energy value. The method further includes determining whether to adjust the value of the counter based on the energy value.

In a sixth aspect alternatively or in addition to one or more of the first through fifth aspects, the energy value fails to satisfy a threshold energy value, and further comprising adjusting the value of the counter.

In a seventh aspect alternatively or in addition to one or more of the first through sixth aspects, the method includes initiating a transmission in response to determining that the value of the counter satisfies a threshold counter value.

In an eighth aspect alternatively or in addition to one or more of the first through seventh aspects, the energy value satisfies a threshold energy value, and further comprising re-initiating the deferral interval.

In a ninth aspect alternatively or in addition to one or more of the first through eighth aspects, the measurement is performed at the beginning of the contention interval.

In a tenth aspect alternatively or in addition to one or more of the first through ninth aspects, the particular duration is based on a processing time associated with the communication device.

In an eleventh aspect alternatively or in addition to one or more of the first through tenth aspects, a method of wireless communication includes determining, by a communication device, a value of a counter associated with a LBT operation. The method further includes, after determining the value of the counter and during a deferral interval associated with the LBT operation, performing a first measurement of a first duration to determine a first energy value. The method further includes, based on the first energy value and during a contention interval following the deferral interval, performing a second measurement of a second duration to determine a second energy value. The method also includes determining whether to adjust the value of the counter based on the second energy value.

In a twelfth aspect alternatively or in addition to one or more of the first through tenth aspects, the second energy value fails to satisfy a threshold energy value, and the method includes adjusting the value of the counter.

In a thirteenth aspect alternatively or in addition to one or more of the first through twelfth aspects, the method includes initiating a transmission in response to determining that the value of the counter satisfies a threshold counter value.

In a fourteenth aspect alternatively or in addition to one or more of the first through thirteenth aspects, the second energy value satisfies a threshold energy value, and the method includes re-initiating the deferral interval.

In a fifteenth aspect alternatively or in addition to one or more of the first through fourteenth aspects, the value of the counter is randomly selected from a group of values including one, two, and three, and zero is excluded from the group of values.

In a sixteenth aspect alternatively or in addition to one or more of the first through fifteenth aspects, a method of wireless communication includes determining, by a communication device, a value of a counter associated with a LBT operation. The method further includes, after determining the value of the counter, performing a first measurement of a first duration during a first portion of a deferral interval associated with the LBT operation to determine a first energy value. The method further includes, during a second portion of the deferral interval, performing a second measurement of a second duration to determine a second energy value. The method also includes, based on the first energy value and the second energy value, determining whether to initiate a contention interval subsequent to the deferral interval.

In a seventeenth aspect alternatively or in addition to one or more of the first through sixteenth aspects, the communication device operates based on a wireless communication protocol that specifies that the first measurement may occur anywhere within the first portion and that the second measurement may occur anywhere within the second portion, and the second portion occupies a remainder of the deferral interval following the first portion.

In an eighteenth aspect alternatively or in addition to one or more of the first through seventeenth aspects, the communication device operates based on a wireless communication protocol that specifies that the first measurement may occur anywhere within the first portion and that the second measurement may occur anywhere within the second portion, and the second portion excludes a gap portion that occurs at the end of the deferral interval.

In a nineteenth aspect alternatively or in addition to one or more of the first through eighteenth aspects, the first duration corresponds to the second duration.

In a twentieth aspect alternatively or in addition to one or more of the first through nineteenth aspects, a method of wireless communication includes determining, by a communication device, a value of a counter associated with a LBT operation. The method further includes, after determining the value of the counter and during a first half of a deferral interval associated with the LBT operation, performing a first measurement of a particular duration to determine a first energy value. The method further includes, during a second half of the deferral interval subsequent to the first half, performing a second measurement of the particular duration to determine a second energy value. The method also includes determining whether to initiate a contention interval associated with the LBT operation based on the first energy value and further based on the second energy value. A first length of the deferral interval is an integer multiple of a second length of the contention interval.

In a twenty-first aspect alternatively or in addition to one or more of the first through twentieth aspects, the first length is twice the second length.

In a twenty-second aspect alternatively or in addition to one or more of the first through twenty-first aspects, the method includes performing a third measurement of a second duration during the contention interval to determine a third energy value and determining whether to initiate a transmission based on the third energy value.

In a twenty-third aspect alternatively or in addition to one or more of the first through twenty-second aspects, a method of wireless communication includes determining, by a communication device, a value of a counter associated with a LBT operation. The method further includes, after determining the value of the counter and during a deferral interval associated with the LBT operation, performing a first measurement of a first duration to determine a first energy value. The method further includes based on the first energy value and during a contention interval following the deferral interval, performing a second measurement of a second duration to determine a second energy value. The method further includes adjusting the value of the counter based on the second energy value, determining that the adjusted value of the counter satisfies a counter threshold value, and determining that one or more transmission criteria for a transmission based on the LBT operation are unsatisfied. The method also includes, during a self-deferral interval that is based on determining that the adjusted value of the counter satisfies the counter threshold value and that the one or more transmission criteria are unsatisfied, performing a one-shot LBT operation prior to a transmission boundary associated with the transmission.

In a twenty-fourth aspect alternatively or in addition to one or more of the first through twenty-third aspects, the one or transmission criteria are based on the transmission boundary failing to align with a slot boundary or with a symbol boundary.

In a twenty-fifth aspect alternatively or in addition to one or more of the first through twenty-fourth aspects, the one-shot LBT operation includes a first measurement performed within a first interval that occurs prior to the transmission boundary and further includes a second measurement performed within a second interval that occurs after the first interval and prior to the transmission boundary, and a duration of the first interval is greater than a duration of the second interval.

In a twenty-sixth aspect alternatively or in addition to one or more of the first through twenty-fifth aspects, the one-shot LBT operation includes a first measurement performed within an interval that occurs prior to the transmission boundary and further includes a second measurement performed within the interval.

In a twenty-seventh aspect alternatively or in addition to one or more of the first through twenty-sixth aspects, the one-shot LBT operation includes a first measurement performed during a first half of an interval that occurs prior to the transmission boundary and further includes a second measurement performed during a second half of the interval.

In a twenty-eighth aspect, a non-transitory computer-readable medium stores instructions executable by a processor to initiate, perform, or control the method of one or more of the first through twenty-seventh aspects.

In a twenty-ninth aspect, an apparatus includes a memory and a processor coupled to the memory and configured to initiate, perform, or control the method of one or more of the first through twenty-seventh aspects.

In a thirtieth aspect alternatively or in addition to one or more of the first through twenty-ninth aspects, a method of wireless communication includes receiving, by a UE from a base station, an LBT configuration message indicating whether Cat2 LBT operations are enabled or disabled for the UE. The method further includes receiving, by the UE from the base station, a COT message configuring the UE with a COT. The method further includes performing, by the UE, an LBT operation based on the LBT configuration message and based on the COT message.

In a thirty-first aspect alternatively or in addition to one or more of the first through thirtieth aspects, the LBT operation is a Cat2 LBT operation based on the LBT configuration message indicating that the Cat2 LBT operations are enabled for the UE, and the LBT operation is another LBT operation based on the LBT configuration message indicating that the Cat2 LBT operations are disabled for the UE.

In a thirty-second aspect alternatively or in addition to one or more of the first through thirty-first aspects, the LBT configuration message has an RRC configuration format.

In a thirty-third aspect alternatively or in addition to one or more of the first through thirty-second aspects, the LBT configuration message is included in an SIB transmitted by the base station or in an RMSI message transmitted by the base station.

In a thirty-fourth aspect alternatively or in addition to one or more of the first through thirty-third aspects, the UE supports multiple types of the Cat2 LBT operations, and the LBT configuration message or another configuration message received by the UE configures the UE with one or more of the multiple types of the Cat2 LBT operations.

In a thirty-fifth aspect alternatively or in addition to one or more of the first through thirty-fourth aspects, the multiple types include a type 2A Cat2 LBT type and a type 2B Cat2 LBT type.

In a thirty-sixth aspect alternatively or in addition to one or more of the first through thirty-fifth aspects, the UE performs the LBT operation prior to a scheduled transmission boundary of a transmission associated with the LBT operation, and the method includes performing the transmission based on success of the LBT operation.

In a thirty-seventh aspect alternatively or in addition to one or more of the first through thirty-sixth aspects, a method of wireless communication includes transmitting, by a base station to a UE, an LBT configuration message indicating whether Cat2 LBT operations are enabled or disabled for the UE. The method further includes transmitting, by the base station to the UE, a COT message configuring the UE with a COT. The UE performs an LBT operation based on the LBT configuration message and based on the COT message.

In a thirty-eighth aspect alternatively or in addition to one or more of the first through thirty-seventh aspects, the LBT operation is a Cat2 LBT operation based on the LBT configuration message indicating that the Cat2 LBT operations are enabled for the UE, and the LBT operation is of another LBT operation based on the LBT configuration message indicating that the Cat2 LBT operations are disabled for the UE.

In a thirty-ninth aspect alternatively or in addition to one or more of the first through thirty-eighth aspects, the LBT configuration message has an RRC configuration format.

In a fortieth aspect alternatively or in addition to one or more of the first through thirty-ninth aspects, the LBT configuration message is included in an SIB transmitted by the base station or in an RMSI message transmitted by the base station.

In a forty-first aspect alternatively or in addition to one or more of the first through fortieth aspects, the UE supports multiple types of the Cat2 LBT operations, and the LBT configuration message or another configuration message received by the UE configures the UE with one or more of the multiple types of the Cat2 LBT operations.

In a forty-second aspect alternatively or in addition to one or more of the first through forty-first aspects, the multiple types include a type 2A Cat2 LBT type and a type 2B Cat2 LBT type.

In a forty-third aspect alternatively or in addition to one or more of the first through forty-second aspects, the UE performs the LBT operation prior to a scheduled transmission boundary of a transmission associated with the LBT operation, and further comprising performing the transmission based on success of the LBT operation.

In a forty-fourth aspect alternatively or in addition to one or more of the first through forty-third aspects, a method of wireless communication includes performing, by a communication device, a first measurement of a first duration during a first portion of a measurement interval associated with an LBT operation to determine a first energy value. The method further includes performing, by the communication device, a second measurement of a second duration during a second portion of the measurement interval to determine a second energy value. The method further includes, based on the first energy value and the second energy value, determining, by the communication device, whether to initiate a transmission associated with the LBT operation.

In a forty-fifth aspect alternatively or in addition to one or more of the first through forty-fifth aspects, the measurement interval has a duration of eight microseconds, and the LBT operation is a Cat2 LBT operation.

In a forty-sixth aspect alternatively or in addition to one or more of the first through forty-fifth aspects, the communication device operates based on a wireless communication protocol that specifies the first portion and the second portion, and the wireless communication protocol further specifies that specifies that the first measurement may occur anywhere within the first portion and that the second measurement may occur anywhere within the second portion.

In a forty-seventh aspect alternatively or in addition to one or more of the first through forty-sixth aspects, the communication device operates based on a wireless communication protocol that specifies the first portion and the second portion, the wireless communication protocol further specifies that specifies that the first measurement may occur anywhere within the first portion and that the second measurement may occur anywhere within the second portion, and the wireless communication protocol further specifies that the measurement interval includes a gap portion following the second portion and having a third duration.

In a forty-eighth aspect alternatively or in addition to one or more of the first through forty-seventh aspects, the wireless communication protocol further specifies that the first duration corresponds to the second duration.

In a forty-ninth aspect alternatively or in addition to one or more of the first through forty-eighth aspects, the measurement interval further includes a gap portion separating the first portion and the second portion, and a length of the measurement interval is configurable by selecting a particular number of instances of the second portion within the measurement interval.

In a fiftieth aspect alternatively or in addition to one or more of the first through forty-ninth aspects, the particular number is configurable using an RRC configuration message.

In a fifty-first aspect alternatively or in addition to one or more of the first through fiftieth aspects, the particular number is specified by a configuration of a hardware component or operating system of the communication device.

In a fifty-second aspect alternatively or in addition to one or more of the first through fifty-first aspects, a combined duration of the first portion and the gap portion corresponds to a first duration of a deferral interval of a Cat4 LBT operation, and a particular duration of the second portion corresponds to a second duration of a contention interval of the Cat4 LBT operation.

In a fifty-third aspect alternatively or in addition to one or more of the first through fifty-second aspects, the measurement interval has a duration of ten microseconds, and the LBT operation is a Cat2 LBT operation.

In a fifty-fourth aspect alternatively or in addition to one or more of the first through fifty-third aspects, the first portion corresponds to a first half of the measurement interval, the second portion corresponds to a second half of the measurement interval, and the first duration corresponds to the second duration.

In a fifty-fifth aspect alternatively or in addition to one or more of the first through fifty-fourth aspects, the method includes determining success of the LBT operation based on the first energy value failing to satisfy a threshold energy value and further based on the second energy value failing to satisfy the threshold energy value.

In a fifty-sixth aspect alternatively or in addition to one or more of the first through fifty-fifth aspects, the method includes determining failure of the LBT operation based on one or both of the first energy value of the second energy value satisfying a threshold energy value.

In a fifty-seventh aspect alternatively or in addition to one or more of the first through fifty-sixth aspects, a method of wireless communication includes receiving, at a UE from a base station, a configuration message indicating that LBT operations performed by the UE are to be performed based on a Cat4 LBT configuration. The method further includes receiving, by the UE from the base station, a grant message scheduling a transmission. The method further includes, based on the grant message, performing, by the UE, one or more LBT operations using the Cat4 LBT configuration.

In a fifty-eighth aspect alternatively or in addition to one or more of the first through fifty-seventh aspects, the Cat4 LBT configuration is associated with a random or pseudo-random selection of a number of instances of a contention interval, and the grant message is received by the UE to at a time selected to enable a deferral interval and a particular number of instances of the contention interval prior to a transmission time of the transmission.

In a fifty-ninth aspect alternatively or in addition to one or more of the first through fifty-eighth aspects, a method of wireless communication includes transmitting, to a UE by a base station, a configuration message indicating that LBT operations performed by the UE are to be performed based on a Cat4 LBT configuration. The method further includes transmitting, to the UE by the base station, a grant message scheduling a transmission. The UE performs one or more LBT operations using the Cat4 LBT configuration based on the grant message.

In a sixtieth aspect alternatively or in addition to one or more of the first through fifty-ninth aspects, the Cat4 LBT configuration is associated with a random or pseudo-random selection of a number of instances of a contention interval, and the grant message is transmitted to the UE to at a time selected to enable a deferral interval and a particular number of instances of the contention interval prior to a transmission time of the transmission.

In a sixty-first aspect, a non-transitory computer-readable medium stores instructions executable by a processor to initiate, perform, or control the method of one or more of the first through sixtieth aspects.

In a sixty-second aspect, an apparatus includes a memory and a processor coupled to the memory and configured to initiate, perform, or control the method of one or more of the first through sixtieth aspects.

In a sixty-third aspect alternatively or in addition to one or more of the first through sixty-second aspects, an apparatus for wireless communication includes a receiver configured to receive, at a user equipment (UE) from a base station, a listen-before-talk (LBT) configuration message indicating whether category 2 (Cat2) LBT operations are enabled or disabled for the UE. The receiver is further configured to receive, at the UE from the base station, a channel occupancy time (COT) message configuring the UE with a COT. The apparatus further includes a transmitter configured to perform a transmission based on an LBT operation. The LBT operation is based on the LBT configuration message and is based further on the COT message.

In a sixty-fourth aspect alternatively or in addition to one or more of the first through sixty-third aspects, the LBT operation is a Cat2 LBT operation based on the LBT configuration message indicating that the Cat2 LBT operations are enabled for the UE, and the LBT operation is another LBT operation based on the LBT configuration message indicating that the Cat2 LBT operations are disabled for the UE.

In a sixty-fifth aspect alternatively or in addition to one or more of the first through sixty-fourth aspects, the LBT configuration message has a radio resource control (RRC) configuration format.

In a sixty-sixth aspect alternatively or in addition to one or more of the first through sixty-fifth aspects, the LBT configuration message is included in a system information block (SIB) transmitted by the base station or in a remaining minimum system information (RMSI) message transmitted by the base station.

In a sixty-seventh aspect alternatively or in addition to one or more of the first through sixty-sixth aspects, the receiver is further configured to support multiple types of the Cat2 LBT operations, and the receiver is further configured to receive the LBT configuration message or another configuration message to configure the UE with one or more of the multiple types of the Cat2 LBT operations.

In a sixty-eighth aspect alternatively or in addition to one or more of the first through sixty-seventh aspects, the multiple types include a type 2A Cat2 LBT type and a type 2B Cat2 LBT type.

In a sixty-ninth aspect alternatively or in addition to one or more of the first through sixty-eighth aspects, the receiver is further configured to perform the LBT operation prior to a scheduled transmission boundary of a transmission associated with the LBT operation, and the transmitter is further configured to perform the transmission based on success of the LBT operation.

In a seventieth aspect alternatively or in addition to one or more of the first through sixty-ninth aspects, an apparatus for wireless communication includes a transmitter configured to transmit, to a user equipment (UE), a listen-before-talk (LBT) configuration message indicating whether category 2 (Cat2) LBT operations are enabled or disabled for the UE. The transmitter is further configured to transmit, to the UE, a channel occupancy time (COT) message configuring the UE with a COT. The apparatus further includes a receiver configured to receive a transmission from the UE based on an LBT operation. The LBT operation is based on the LBT configuration message and is based further on the COT message.

In a seventy-first aspect alternatively or in addition to one or more of the first through seventieth aspects, the LBT operation is a Cat2 LBT operation based on the LBT configuration message indicating that the Cat2 LBT operations are enabled for the UE, and the LBT operation is of another LBT operation based on the LBT configuration message indicating that the Cat2 LBT operations are disabled for the UE.

In a seventy-second aspect alternatively or in addition to one or more of the first through seventy-first aspects, the LBT configuration message has a radio resource control (RRC) configuration format.

In a seventy-third aspect alternatively or in addition to one or more of the first through seventy-second aspects, the transmitter is further configured to transmit the LBT configuration message in a system information block (SIB) or in a remaining minimum system information (RMSI) message.

In a seventy-fourth aspect alternatively or in addition to one or more of the first through seventy-third aspects, the UE is configured to support multiple types of the Cat2 LBT operations, and the transmitter is further configured to transmit the LBT configuration message or another configuration message to configure the UE with one or more of the multiple types of the Cat2 LBT operations.

In a seventy-fifth aspect alternatively or in addition to one or more of the first through seventy-fourth aspects, the multiple types include a type 2A Cat2 LBT type and a type 2B Cat2 LBT type.

In a seventy-sixth aspect alternatively or in addition to one or more of the first through seventy-fifth aspects, the UE is configured to perform the LBT operation prior to a scheduled transmission boundary of a transmission associated with the LBT operation, and the receiver is further configured to receive the transmission based on success of the LBT operation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and devices described herein (e.g., one or more components, functional blocks, and devices of FIG. 2) may include one or more processors, electronics devices, hardware devices, electronics components, logical circuits, memories, software codes, firmware codes, etc., or any combination thereof. Those of skill would further appreciate that the various illustrative logical blocks, devices, circuits, and operations described herein may be implemented using electronic hardware, computer software, or combinations of both. To illustrate, various components, blocks, devices, circuits, and steps have been described above generally in terms of their functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
a receiver configured to receive, at a user equipment (UE) from a base station, a listen-before-talk (LBT) configuration message indicating whether category 2 (Cat2) LBT operations are enabled or disabled for the UE and to receive, at the UE from the base station, a channel occupancy time (COT) message configuring the UE with a COT, the LBT configuration message including one or more bits configured to indicate, in accordance with the one or more bits having a first value, that the Cat2 LBT operations are enabled for the UE and further configured to indicate, in accordance with the one or more bits having a second value, that the Cat2 LBT operations are disabled for the UE; and
a transmitter configured to perform an uplink transmission based on an LBT operation, wherein the LBT operation is based on the LBT configuration message and is based further on the COT message.

2. The apparatus of claim 1, wherein the LBT operation is a Cat2 LBT operation based on the LBT configuration message indicating that the Cat2 LBT operations are enabled for the UE, and wherein the LBT operation is another LBT operation based on the LBT configuration message indicating that the Cat2 LBT operations are disabled for the UE.

3. The apparatus of claim 1, wherein the LBT configuration message has a radio resource control (RRC) configuration format.

4. The apparatus of claim 1, wherein the LBT configuration message is included in a system information block (SIB) transmitted by the base station or in a remaining minimum system information (RMSI) message transmitted by the base station.

5. The apparatus of claim 1, wherein the receiver is further configured to support multiple types of the Cat2 LBT operations, and wherein the receiver is further configured to receive the LBT configuration message or another configuration message to configure the UE with one or more of the multiple types of the Cat2 LBT operations.

6. The apparatus of claim 5, wherein the multiple types include a type 2A Cat2 LBT type and a type 2B Cat2 LBT type.

7. The apparatus of claim 1, wherein the receiver is further configured to perform the LBT operation prior to a scheduled transmission boundary of the uplink transmission, and wherein the transmitter is further configured to perform the transmission based on success of the LBT operation.

8. An apparatus for wireless communication, the apparatus comprising:
a transmitter configured to transmit, to a user equipment (UE), a listen-before-talk (LBT) configuration message indicating whether category 2 (Cat2) LBT operations are enabled or disabled for the UE and further configured to transmit, to the UE, a channel occupancy time (COT) message configuring the UE with a COT, the LBT configuration message including one or more bits configured to indicate, in accordance with the one or more bits having a first value, that the Cat2 LBT operations are enabled for the UE and further configured to indicate, in accordance with the one or more bits having a second value, that the Cat2 LBT operations are disabled for the UE; and
a receiver configured to receive a transmission from the UE based on an LBT operation, wherein the LBT operation is based on the LBT configuration message and is based further on the COT message.

9. The apparatus of claim 8, wherein the LBT operation is a Cat2 LBT operation based on the LBT configuration message indicating that the Cat2 LBT operations are enabled for the UE, and wherein the LBT operation is of another LBT operation based on the LBT configuration message indicating that the Cat2 LBT operations are disabled for the UE.

10. The apparatus of claim 8, wherein the LBT configuration message has a radio resource control (RRC) configuration format.

11. The apparatus of claim 8, wherein the transmitter is further configured to transmit the LBT configuration message in a system information block (SIB) or in a remaining minimum system information (RMSI) message.

12. The apparatus of claim 8, wherein the UE is configured to support multiple types of the Cat2 LBT operations, and wherein the transmitter is further configured to transmit the LBT configuration message or another configuration message to configure the UE with one or more of the multiple types of the Cat2 LBT operations.

13. The apparatus of claim 12, wherein the multiple types include a type 2A Cat2 LBT type and a type 2B Cat2 LBT type.

14. The apparatus of claim 8, wherein the UE is configured to perform the LBT operation prior to a scheduled transmission boundary of the transmission, and wherein the receiver is further configured to receive the transmission based on success of the LBT operation.

15. A method of wireless communication by a user equipment (UE), the method comprising:
receiving, at the UE from a base station, a listen-before-talk (LBT) configuration message indicating whether category 2 (Cat2) LBT operations are enabled or disabled for the UE, the LBT configuration message including one or more bits configured to indicate, in accordance with the one or more bits having a first value, that the Cat2 LBT operations are enabled for the UE and further configured to indicate, in accordance with the one or more bits having a second value, that the Cat2 LBT operations are disabled for the UE;

receiving, at the UE from the base station, a channel occupancy time (COT) message configuring the UE with a COT; and performing, by the UE, an uplink transmission based on an LBT operation, wherein the LBT operation is based on the LBT configuration message and is based further on the COT message.

16. The method of claim 15, wherein the LBT operation is a Cat2 LBT operation based on the LBT configuration message indicating that the Cat2 LBT operations are enabled for the UE, and wherein the LBT operation is another LBT operation based on the LBT configuration message indicating that the Cat2 LBT operations are disabled for the UE.

17. The method of claim 15, wherein the LBT configuration message has a radio resource control (RRC) configuration format.

18. The method of claim 15, wherein the LBT configuration message is included in a system information block (SIB) transmitted by the base station or in a remaining minimum system information (RMSI) message transmitted by the base station.

19. The method of claim 15, wherein the UE supports multiple types of the Cat2 LBT operations, and further comprising receiving a configuration of one or more of the multiple types of the Cat2 LBT operations.

20. The method of claim 19, wherein the multiple types include a type 2A Cat2 LBT type and a type 2B Cat2 LBT type.

21. The method of claim 15, wherein the LBT operation is performed prior to a scheduled transmission boundary of the uplink transmission, and wherein the transmission is performed based on success of the LBT operation.

22. A method for wireless communication by a network node, the method comprising:

transmitting, to a user equipment (UE), a listen-before-talk (LBT) configuration message indicating whether category 2 (Cat2) LBT operations are enabled or disabled for the UE, the LBT configuration message including one or more bits configured to indicate, in accordance with the one or more bits having a first value, that the Cat2 LBT operations are enabled for the UE and further configured to indicate, in accordance with the one or more bits having a second value, that the Cat2 LBT operations are disabled for the UE;

transmitting, to the UE, a channel occupancy time (COT) message configuring the UE with a COT; and receiving a transmission from the UE based on an LBT operation, wherein the LBT operation is based on the LBT configuration message and is based further on the COT message.

23. The method of claim 22, wherein the LBT operation is a Cat2 LBT operation based on the LBT configuration message indicating that the Cat2 LBT operations are enabled for the UE, and wherein the LBT operation is of another LBT operation based on the LBT configuration message indicating that the Cat2 LBT operations are disabled for the UE.

24. The method of claim 22, wherein the LBT configuration message has a radio resource control (RRC) configuration format.

25. The method of claim 22, wherein the LBT configuration message is included in a system information block (SIB) or in a remaining minimum system information (RMSI) message.

26. The method of claim 22, wherein the UE supports multiple types of the Cat2 LBT operations, and further comprising transmitting a configuration of the UE with one or more of the multiple types of the Cat2 LBT operations.

27. The method of claim 26, wherein the multiple types include a type 2A Cat2 LBT type and a type 2B Cat2 LBT type.

28. The method of claim 22, wherein the LBT operation is performed prior to a scheduled transmission boundary of the transmission, and wherein the transmission is received based on success of the LBT operation.

29. The method of claim 15, wherein the first value corresponds to one of a logic zero value or a logic one value to indicate that the Cat2 LBT operations are enabled for the UE, and wherein the second value corresponds to the other of the logic zero value or the logic one value to indicate that the Cat2 LBT operations are disabled for the UE.

30. The method of claim 15, further comprising:

in accordance with the LBT configuration indicating, via the one or more bits, that that the Cat2 LBT operations are disabled for the UE, setting a value of a counter associated with category four (Cat4) LBT operations, wherein the LBT operation corresponds to a Cat4 LBT operation that is performed in accordance with the value of the counter.

* * * * *